US012763662B2

(12) United States Patent
Chien

(10) Patent No.: US 12,763,662 B2
(45) Date of Patent: Oct. 13, 2026

(54) ZERO-VOLTAGE SWITCHING CONTROL CIRCUIT, METHOD THEREFOR, AND VOLTAGE CONVERTER

(71) Applicant: Shanghai Baigong Semiconductor Co., Ltd., Shanghai (CN)

(72) Inventor: Ming-tai Chien, Shanghai (CN)

(73) Assignee: Shanghai Baigong Semiconductor Co., Ltd., Shanghai (CN)

( * ) Notice: Subject to any disclaimer, the term of this patent is extended or adjusted under 35 U.S.C. 154(b) by 630 days.

(21) Appl. No.: 17/993,957

(22) Filed: Nov. 24, 2022

(65) Prior Publication Data

US 2023/0092299 A1 Mar. 23, 2023

Related U.S. Application Data

(63) Continuation of application No. PCT/CN2021/089653, filed on Apr. 25, 2021.

(30) Foreign Application Priority Data

Nov. 16, 2020 (CN) ........................ 202011279082.X

(51) Int. Cl.
*H02M 3/335* (2006.01)
*H02M 1/00* (2006.01)

(52) U.S. Cl.
CPC ........ *H02M 1/0058* (2021.05); *H02M 1/0009* (2021.05); *H02M 1/0019* (2021.05); *H02M 3/33507* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,295,213 B1 * 9/2001 Smith ............... H02M 3/33569 363/21.01
7,130,204 B2 * 10/2006 Tsuruya ............ H02M 3/33569 363/21.01

(Continued)

FOREIGN PATENT DOCUMENTS

CN 107181410 A 9/2017
CN 109905030 A 6/2019

(Continued)

OTHER PUBLICATIONS

International Search Report, issued in PCT/CN2021/089653, dated Aug. 10, 2021.

(Continued)

*Primary Examiner* — Crystal L Hammond
*Assistant Examiner* — Nusrat Quddus
(74) *Attorney, Agent, or Firm* — Bayramoglu Law Offices LLC

(57) ABSTRACT

Disclosed are a novel zero-voltage switching control circuit and a control method. By a chip of a controller, a first switch unit is controlled to switch on-off of an input winding and a second switch unit is controlled to switch on-off between an auxiliary winding and a negative voltage level, wherein before the input winding is conducted, the auxiliary winding of a voltage converter is conducted with the negative voltage level in advance, and the input winding is forced to generates a negative current based on a coupling effect between the input winding and auxiliary winding, to release the energy of parasitic capacitance in the first switch unit cross voltages, so as to further enable a polarity inversion of the input winding, and the first switch unit cross-voltage decays to an expected low switching potential level. The invention can achieve the zero-voltage switching under a Continuous Conduction Mode (CCM) and a Dis-continuous Conduction Mode (DCM) to reduce the power consumption in switching (Continued)

of first electronic switch, and also in the embodiment of a Flyback converter, it separates the primary current and secondary current from each other that are originally with short overlap under the cross-over transition in CCM operation, so as to avoid a cross-conduction happens as well as to reduce the obstacle in controlling secondary side synchronous rectification.

19 Claims, 24 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; Y02B 70/1491; H02J 3/46; H02J 3/38
See application file for complete search history.

(56) References Cited

U.S. PATENT DOCUMENTS

| | | | | | |
|---|---|---|---|---|---|
| 8,743,565 | B2 * | 6/2014 | Telefus | H02M 3/33523 | 363/21.02 |
| 10,135,348 | B2 * | 11/2018 | Hsiao | H02M 3/33546 | |
| 10,574,148 | B1 | 2/2020 | Jitaru | | |
| 10,985,665 | B1 * | 4/2021 | Yan | H03K 17/133 | |
| 11,018,593 | B1 * | 5/2021 | Yau | H02M 1/083 | |
| 11,050,350 | B1 * | 6/2021 | Choi | H02M 3/33576 | |
| 2008/0225558 | A1 * | 9/2008 | Gordon | H02M 3/33571 | 363/21.15 |
| 2009/0257255 | A1 * | 10/2009 | Zhang | H02M 3/335 | 363/50 |
| 2019/0149052 | A1 * | 5/2019 | Gong | H02M 3/33592 | 363/21.07 |
| 2022/0216798 | A1 * | 7/2022 | Liu | H02M 3/33592 | |
| 2025/0293584 | A1 * | 9/2025 | Jitaru | H02M 1/4258 | |

FOREIGN PATENT DOCUMENTS

| | | | |
|---|---|---|---|
| CN | 110677013 | A | 1/2020 |
| CN | 112532066 | A | 3/2021 |

OTHER PUBLICATIONS

Written Opinion, issued in PCT/CN2021/089653, dated Aug. 10, 2021.

* cited by examiner

ZERO-VOLTAGE SWITCHING CONTROL CIRCUIT, METHOD THEREFOR, AND VOLTAGE CONVERTER

The present application is a continuation of International Application No. PCT/CN2021/089653, filed Apr. 25, 2021, which claims the priority of Chinese Patent Application No. 202011279082.X, field on Nov. 16, 2020. The contents of International Application No. PCT/CN2021/089653 and Chinese Patent Application No. 202011279082.X are hereby incorporated by reference.

BACKGROUND OF THE INVENTION

Field of the Invention

The invention belongs to the technical field of power electronics, particularly to a novel zero-voltage switching control circuit, a control method, and a voltage converter.

Description of the Prior Art

The growing demand for the high-power-density and small-outline has forced the designer to increase the switching frequency. However, the biggest obstacle to this goal is the significant switching losses comes from the inherent output parasitic capacitor of the high-voltage semiconductor power switch, i.e., Coss.

In response, the Active Clamp Flyback (ACF) and Quasi-Resonant (QR) Flyback technology is available on the market to achieve Zero-Voltage Switching (ZVS). However, the drawback of ACF is that requires many high-cost components, such as GaNFET, high-voltage isolated gate driver, etc., and QR cannot achieve ZVS at high-line 230 Vac input condition, and both ACF and QR are operate at Dis-continues Conduction Mode (DCM) which with larger resistive losses.

Specifically, FIG. 1 illustrates a typical Flyback converter, one of the prior art QRF to address the switching losses is using a real time sensing the valley of resonant waveform during the dead time to perform the valley-switching to reduce the switching losses, this technique may perform a near or real ZVS at low-line 115 Vac condition.

However, QR technology does not fully perform the true ZVS, as the FIG. 2 illustrates the middle-light load condition, and FIG. 3 illustrate the heavy-full load condition which always switching at first valley, there may still be the hard-switching of up to 250 volts at the input of a high-voltage of upper limit 264 Vac.

In addition, as shown in FIG. 4, since the control signal of the primary side of the Flyback converter side dominates the behavior of the whole switching cycle, the primary current in the next cycle is initiated first, and then the secondary current on the secondary side is turned off correspondingly. Therefore, when SR (Synchronous-Rectification) operates in CCM condition, a synchronous conduction phenomenon in the moment of cross-over will appear, called cross-conduction. The cross-conduction makes high risk of system damage and it's hard to be resolved totally.

SUMMARY OF THE INVENTION

In order to improve the above technical challenges, the invention provides a novel zero-voltage switching control circuit, a control method and a voltage converter. The technical solution of the invention is as follows:

A novel zero-voltage switching control circuit, applied to a voltage converter, the novel zero-voltage switching control circuit including a controller, a first switch unit, and a second switch unit, the controller being in a signal connection with the first switch unit and the second switch unit respectively;

wherein the controller is configured to generate a first control signal to control the first switch unit to switch on-off of an input winding of the voltage converter, and also to generate a second control signal to control the second switch unit to switch on-off between an auxiliary winding of the voltage converter and a negative voltage level, the input winding being coupled with the auxiliary winding;

wherein before the first control signal conducts the input winding, the auxiliary winding of the voltage converter is connected to a negative voltage level in advance, and based on the coupling effect between the input winding and the auxiliary winding, the input winding is forced to generates a negative current to discharge the energy of parasitic capacitance in the first switch unit, and then the polarity of the input winding is further reversed until the cross voltage of the first switch unit decays to an expected low switching potential and then turning on the first switch unit and conducts the input winding.

In an embodiment, the second switch unit includes a second electronic switch, a second diode and a second capacitor, and the auxiliary winding is a single winding;

one end of the second electronic switch and a negative electrode of the second diode are electrically connected with one end of the auxiliary winding respectively, the other end of the auxiliary winding is connected to primary-side ground; the other end of the second electronic switch is electrically connected with a positive electrode of the second diode and one end of the second capacitor, and the other end of the second capacitor is connected to primary-side ground, wherein a node between the second diode and the second capacitor is configured to generate the negative voltage level.

In an embodiment, the second switch unit includes a second electronic switch, a second diode and a second capacitor, and the auxiliary winding is a double winding including a called coupled winding and a negative voltage winding;

one end of the second electronic switch is electrically connected with one end of the coupled winding, the other end of the coupled winding is connected to primary-side ground; the other end of the second electronic switch is electrically connected with a positive electrode of the second diode and one end of the second capacitor, and the other end of the second capacitor is connected to primary-side ground; the negative electrode of the second diode is electrically connected with one end of the negative voltage winding, and the other end of the negative voltage winding is connected to primary-side ground, wherein a node between the second diode and the second capacitor is configured to generate the negative voltage level.

In an embodiment, the second switch unit further includes a drive resistor, a drive capacitor and a current limiting resistor;

a control end of the second electronic switch is electrically connected with one end of the drive resistor and the drive capacitor respectively, the other end of the drive resistor is electrically connected to the positive electrode of the second diode, and the other end of the drive capacitor is electrically connected with the controller via the current limiting resistor.

In an embodiment, the novel zero-voltage switching control circuit further includes an offset clamp unit, wherein the offset clamp unit comprising a third electronic switch, a clamp resistor and a clamp capacitor;

wherein one end of the third electronic switch is electrically connected with the control end of the second electronic switch, the other end of the third electronic switch is electrically connected with the positive electrode of the second diode and one end of the clamp resistor respectively, and a control end of the third electronic switch is electrically connected with the other end of the clamp resistor and one end of the clamp capacitor respectively, the other end of the clamp capacitor being connected to primary-side ground;

the third electronic switch could be a electronic switch, which can be a NMOSFET or NPN-BJT.

In an embodiment, the second switch unit further includes a current limiting inductor and a third diode; the current limiting inductor is configured to limit a current value passing through the second electronic switch, and the third diode is configured to block a reverse current from passing through a body diode of the second electronic switch.

In an embodiment, the second switch unit includes a second electronic switch and a second capacitor, and the auxiliary winding is a single winding; one end of the second capacitor is electrically connected with one end of the auxiliary winding, the other end of the auxiliary winding is connected to primary-side ground, and the other end of the second capacitor is connected to primary-side ground via the second electronic switch.

In an embodiment, the second switch unit further includes a current limiting inductor, a second diode and a third diode, are placed between the second capacitor and the auxiliary winding; a positive electrode of the second diode and a negative electrode of the third diode are electrically connected with the second capacitor, a negative electrode of the second diode is electrically connected with the auxiliary winding, and a positive electrode of the third diode is electrically connected with the auxiliary winding via the current limiting inductor, wherein the current limiting inductor is configured to limit a current value passing through the second electronic switch.

In an embodiment, the second switch unit includes a second electronic switch, a second diode, a third diode and a second capacitor, and the auxiliary winding is a double winding including a coupled winding and a negative voltage winding;

the negative electrode of the second diode is electrically connected with one end of the negative voltage winding, and the other end of the negative voltage winding is connected to primary-side ground; the positive electrode of the second diode and the negative electrode of the third diode are electrically connected with one end of the second capacitor, and the positive electrode of the third diode is electrically connected with one end of the coupled winding; the other end of the coupled winding is connected to primary-side ground, and the other end of the second capacitor is connected to primary-side ground via the second electronic switch, wherein the node between the second diode and the second capacitor is configured to generate the negative voltage level.

In an embodiment, the second switch unit further includes a current limiting inductor placed between the third diode and the coupled winding, and the current limiting inductor is configured to limit a current value passing through the second electronic switch. In an embodiment, the second switch unit further includes a drive resistor and a current limiting resistor;

the control end of the second electronic switch is electrically connected with one end of the drive resistor and the current limiting resistor respectively, the other end of the drive resistor is connected to primary-side ground, and the other end of the current limiting resistor is electrically connected with the controller.

A novel zero-voltage switching control method, applied to a voltage converter, the voltage converter at least including a first switch unit and a second switch unit, wherein the first switch unit is configured to switch on-off of an input winding of the voltage converter, and the second switch unit is configured to switch on-off between an auxiliary winding of the voltage converter and a negative voltage level, the input winding being coupled with the auxiliary winding, the method including steps of:

before controlling the first control signal to conduct the input winding, controlling the second switch unit to connect the auxiliary winding of the voltage converter with the negative voltage level in advance, and based on the coupling effect between the input winding and the auxiliary winding, the input winding is forced to generates a negative current to discharge the energy of parasitic capacitance in the first switch unit, and then the polarity of the input winding is further reversed until the cross voltage of the first switch unit decays to an expected low switching potential and then turning on the first switch unit and conducts the input winding for achieving the zero-voltage switching.

In an embodiment, the controlling the second switch unit to connect the auxiliary winding with the negative voltage level in advance further includes:

controlling a moment when the second switch unit conducts the auxiliary winding with the negative voltage level according to a clock signal of the voltage converter and a feedback signal of the output winding of the voltage converter.

In an embodiment, the releasing an energy of a parasite capacitor in the first switch unit and connecting the input winding until the first switch unit decays to an expected low switching potential cross voltage further includes:

setting a first delay time after the second switch unit conducts the auxiliary winding with the negative voltage level and before the first switch unit conducts the input winding, wherein the first delay time is set according to a volume of the parasitic capacitance in the first electronic switch, and is controlled and programmable by a PMW controller of the voltage converter.

In an embodiment, the controlling programmable by a PWM controller of the voltage converter further includes:

Capturing, by the PWM controller, a load current value of the voltage converter and performing compensation adjustment for the first delay time according to the load current.

In an embodiment, after the first switch unit conducts the input winding, a second delay time is set for extending a short overlap conduction time of the second switch unit to ensure that the first switch unit is completely conducted before the second switch unit turns off.

In an embodiment, the releasing an energy of a parasitic capacitance in the first switch unit until the first switch unit is pulled down to an expected low switching potential cross voltages then conducting the input winding further includes:

sensing a waveform signal on the auxiliary winding and controlling the turn-on timing of the first switch unit according to the waveform signal after the second switch unit conducts the auxiliary winding with the negative voltage level.

In an embodiment, the controlling turn-on timing of the first switch unit according to the waveform signal further includes:

controlling the first switch unit to conduct the input winding when a voltage of the waveform signal is lower than an expected low voltage threshold, wherein the waveform signal is a signal obtained by a waveform on the auxiliary winding through resistive voltage divider and capacitive filtration, and a moment when the first switch unit conducts the input winding is controlled by adjusting a corresponding RC time constant.

In an embodiment, the control method further includes steps of:

real time sensing the output voltage of the output winding of the voltage converter, and adjusting a pulse width of the control signal of the first switch unit according to the output voltage.

In an embodiment, the control method further includes steps of:

real time sensing a current signal flowing through the first electronic switch and converting the current signal into a voltage signal, and performing short-circuit detection and over-current protection on the first electronic switch according to the voltage signal.

A voltage converter, including the novel zero-voltage switching control circuit according to any one of the above embodiments.

Compared with the prior art, the invention has the following advantages and positive contribution:

1) according to the invention, before the first switch unit turns on, the second switch unit turns on earlier to connect the auxiliary winding with the negative voltage level in advance, based on the coupling between the input winding and auxiliary winding, the input winding is forced to generates a negative current to force the cross voltage of the first switch unit decays to an expected low switching potential, wherein this control circuit and the control mechanism is truly works for both DCM and even at CCM so as to truly realize the zero-potential switching of the voltage converter and to greatly reduce the switching losses and conduction losses at same time;

2) meanwhile, the invention overcome the challenge of synchronous rectification in CCM operation, wherein a phenomenon that is approximate to the short circuit may appear at an overlap region between the primary current and the secondary current under the operation of CCM, and a delay time is created by turning-on the second switch unit before the first switch unit is turned-on in the invention so that the currents on the primary side and the secondary side of the converter are separated to each other without overlap anymore, thereby greatly reducing the obstacle in controlling the synchronous-rectification of the secondary side and improving the safety of the voltage converter, truly totally resolved CCM Synchronous-Rectification cross-conduction issue;

3) according to the invention, the power supply unit first charges the first capacitor by the access power source through the first resistor when the circuit is initiated until the controller reaches an initiating voltage, and then the controller begins to drive the first switch unit so that the input winding generates a direct-current voltage while the input winding is also coupled to the voltage so that the voltage is used to charge the first capacitor through the first diode for the controller to use, thereby reducing the losses brought by providing the power source with the first resistor;

4) the controller of the invention may also sensing a current signal flowing through the first electronic switch in real-time, convert the current signal into a voltage signal, and perform short-circuit detection and over-current protection on the first electronic switch according to the voltage signal, so as to improve the safety of the converter;

5) according to the invention, with the energy storage capacitor, the energy released by pulling down the voltage of the first switching unit may be recovered when the negative current is generated by the input winding, and then released again in the next operating cycle, thereby saving energy waste and improving the energy conversion efficiency of the converter.

BRIEF DESCRIPTION OF THE DRAWINGS

With the detailed description of the preferred embodiments below, various other advantages and benefits shall become clear to those of ordinary skill in the art. The drawings are only used for the purpose of illustrating the preferred embodiments and are not considered as a limitation to the invention.

DESCRIPTION OF REFERENCE NUMERALS

1—Controller; 2—first switch unit; 3—second switch unit; 4—feedback compensation unit; 5—power supply unit; 6—offset clamp unit.

DESCRIPTION OF THE PREFERRED EMBODIMENTS

In order to give an explicit description of the embodiment of the invention or the technical solution in the prior art, the following will be compared with the drawings to illustrate the specific embodiment of the invention. Obviously, the drawings below are only some examples of the invention, and the ordinary artisans concerned may obtain other drawings and other embodiments on the basis of these drawings without making creative efforts.

In order to make the diagrams simple, the diagrams only indicate the parts related to the invention, which do not represent its actual structure as a product. In addition, to make the diagrams simple and easy to understand, in some diagrams, components with the same structure or function are shown only by one of them indicatively, or by marking only one of them. Herein, “one” means not only “only one” but also “more than one”.

An isolation-type power source synchronous rectifier and a method therefor according to the invention is further described in combination with drawings and specific embodiments.

Figure 5:
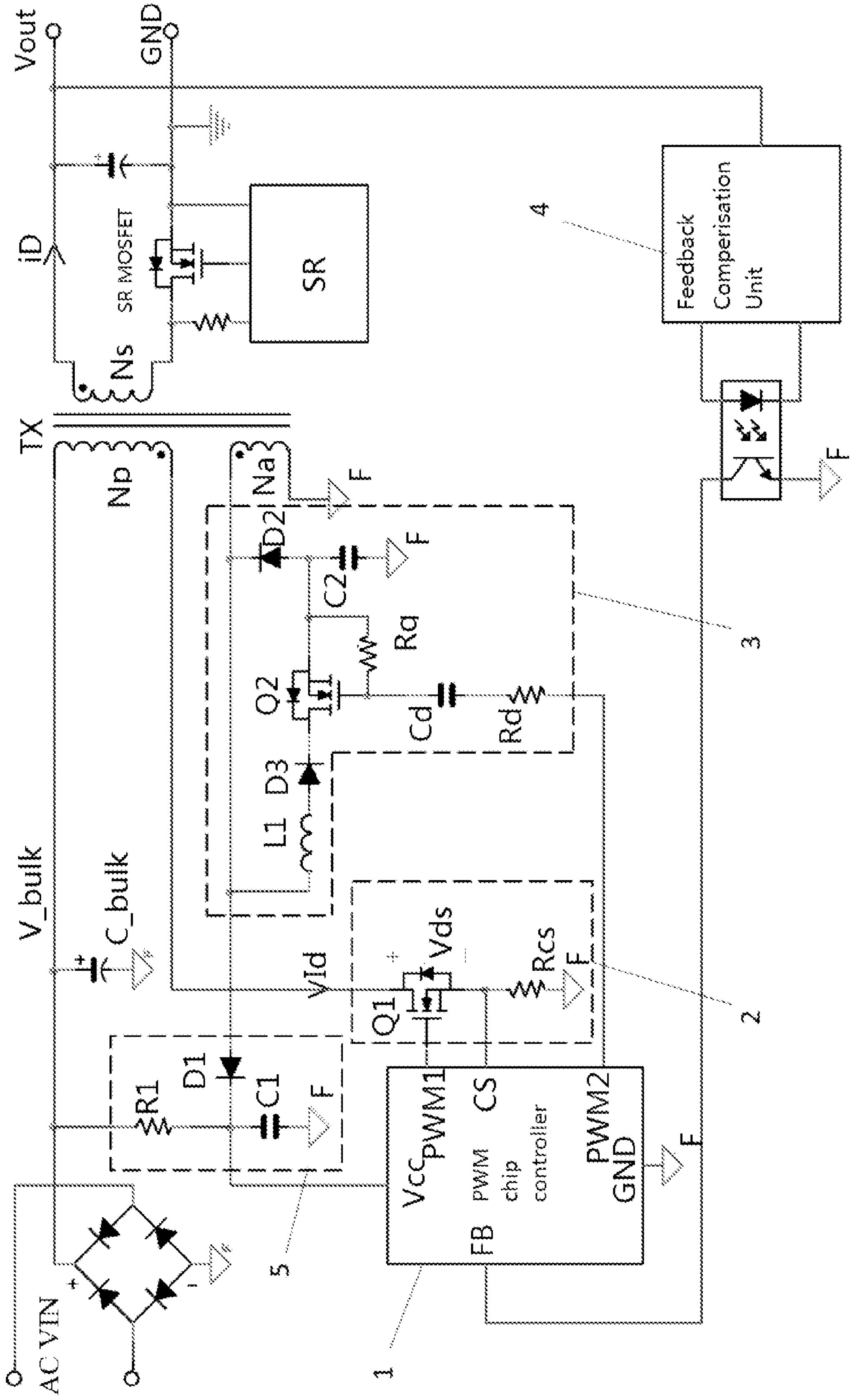
FIG. 5 is a structural diagram of a float-switch single winding of a novel zero-voltage switching control circuit according to an embodiment of the invention.

With reference to FIG. 5, an embodiment of the invention provides a novel zero-voltage switching control circuit, which is applied to a voltage converter. The novel zero-voltage switching control circuit includes a controller 1, a first switch unit 2, and a second switch unit 3. The controller 1 is in a signal connection with the first switch unit 2 and the second switch unit 3, respectively.

The controller 1 is configured to generate a first control signal PWM1 to control the first switch unit 2 to switch on-off of an input winding Np of the voltage converter. Also, the controller 1 is configured to generate a second control signal PWM2 to control the second switch unit 3 to switch on-off between an auxiliary winding Na of the voltage converter and a negative voltage level. The input winding Np is coupled with the auxiliary winding Na.

Before the first control signal PWM1 conducts the input winding Np, the auxiliary winding Na of the voltage converter is connected with the negative voltage level in advance, and a negative current −Id is generated by the input winding Np based on a coupling effect between the input winding Np and the auxiliary winding Na to release an energy of a parasitic capacitance Coss in the first switch unit 2, so as to further force the input winding Np polarity to reverse until the first switch unit 2 cross voltage Vds decays to an expected low switching potential for achieving the zero-voltage switching.

The embodiment is described in detail, but not limited to this.

The embodiment can apply to the voltage converter, and specifically may be served as a switching operation of the converter for the control circuit of the primary side, so that the switching losses under a continuous conduction mode (CCM) or a discontinuous conduction mode (DCM) is reduced, and also to separate primary current and a secondary current that are inherently short overlap in crossed over region from each other, so as to avoid a cross-conduction happens to reduce the obstacle in controlling a synchronous rectification circuit of the secondary side.

The embodiment is suitable for any voltage converter with these characteristics as long as the zero-voltage switching is achieved based on this method, such as DC-DC boost converter, boost PFC pre-regulator, forward converter, etc. In the embodiment, the Fly-back converter is described as the main topic, which is not limited here. The negative voltage level is only for the properties of the polarity of the winding of the Fly-back converter. Broadly speaking, the description of the embodiment is not limited to the negative voltage level. If the polarities of the windings of the converter are different, the negative voltage may also be converted into a positive voltage, which is used according to the same method for these characteristics as well.

With reference to FIG. 5, in the embodiment, by inputting an AC, DC voltage is obtained after being subjected to the rectification and the filtration with a bridge rectifier and a capacitor, and the DC voltage is input into the input winding Np of the transformer TX. The above is a way of accessing the power source of the embodiment. Obviously, the embodiment is not limited to this, and the input Np of the TX of the embodiment may also directly access some regular direct current power sources for conversion operations.

With reference to FIG. 5, in a first embodiment, the second switch unit 3 of the embodiment adopts a float-switch single winding circuit structure, which includes a second electronic switch Q2, a second diode D2, and a second capacitor C2, the auxiliary winding being a single winding, wherein one end of the second electronic switch Q2 and a negative electrode of the second diode D2 are electrically connected with one end of the auxiliary winding Na respectively, the other end of the auxiliary winding Na is connected to primary-side ground; the other end of the second electronic switch Q2 is electrically connected with a positive electrode of the second diode D2 and one end of the second capacitor C2, and the other end of the second capacitor C2 is connected to primary-side ground. Specifically, the node between the second diode D2 and the second capacitor C2 is configured to generate the negative voltage level.

Figure 6A:
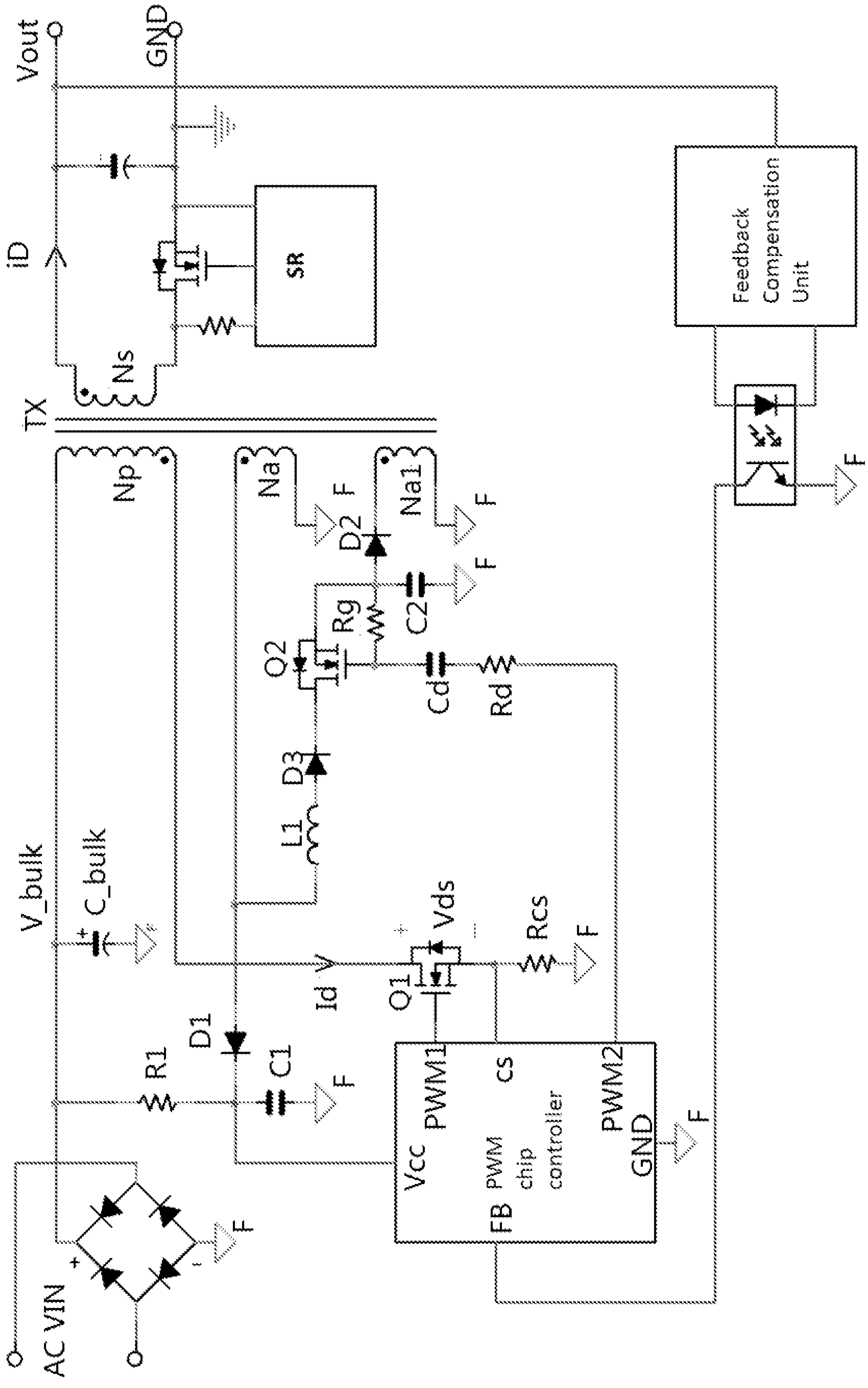
FIGS. 6*a* and 6*b* are structural diagrams of a float-switch double winding of a novel zero-voltage switching control circuit according to an embodiment of the invention.
Figure 6B:
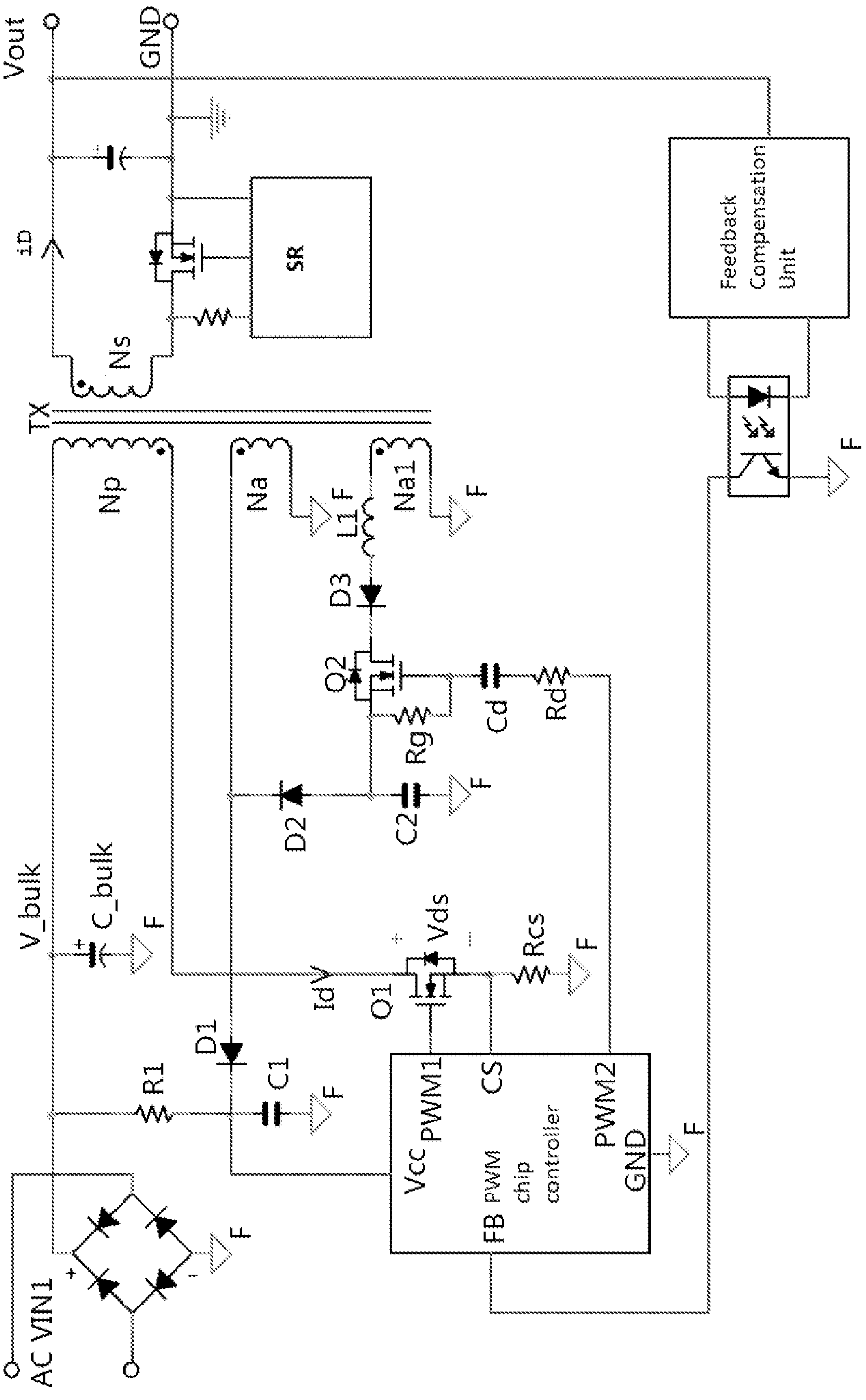

With reference to FIGS. 6*a*~*b*, in a second embodiment, the second switch unit 3 of the embodiment adopts a float-switch double winding circuit structure, wherein there may also be two auxiliary windings in the embodiment, i.e., a coupled winding and a negative voltage winding. As shown in the figures, the second switch unit of the embodiment also includes the second electronic switch Q2, the second diode D2 and the second capacitor C2.

Specifically, with reference to FIG. 6*a*, one end of the second electronic switch Q2 is electrically connected with one end of the coupled winding Na, the other end of the coupled winding Na is connected to primary-side ground; the other end of the second electronic switch Q2 is electrically connected with a positive electrode of the second diode D2 and one end of the second capacitor C2, and the other end of the second capacitor C2 is connected to primary-side ground; the negative electrode of the second diode D2 is electrically connected with one end of the negative voltage winding Na1, and the other end of the negative voltage winding Na1 is connected to primary-side ground, wherein a node between the second diode D2 and the second capacitor C2 is configured to generate the negative voltage level.

Specifically, with reference to FIG. 6*b*, this figure differs from the structure shown in FIG. 6*a* in the way in which the second switch unit is connected with the coupled winding and the negative voltage winding, but the way is the same as the circuit principle of FIGS. 6*a* and 6*b* naturally, wherein one end of the second electronic switch Q2 is electrically connected with one end of the coupled winding Na1, the other end of the coupled winding Na1 is connected to primary-side ground; the other end of the second electronic switch Q2 is electrically connected with a positive electrode of the second diode D2 and one end of the second capacitor C2, and the other end of the second capacitor C2 is connected to primary-side ground; the negative electrode of the second diode D2 is electrically connected with one end of the negative voltage winding Na, and the other end of the negative voltage winding Na is connected to primary-side ground, wherein a node between the second diode D2 and the second capacitor C2 is configured to generate the negative voltage level.

With reference to FIGS. 5, 6*a*, and 6*b*, the above three different circuit structures all achieve the conduction between the auxiliary winding and the negative voltage level, and the negative current is generated by the input winding Np based on the coupling effect between the windings to release an energy of a parasitic capacitance Coss in the first switch unit and to conduct the input winding Np before the first switch unit is pulled down to an expected low switching potential under the cross voltage Vds for achieving the zero-voltage switching. The single winding has an advantage of reducing the cost of one winding, and has a disadvantage of the inability to make possible required adjustments or optimizations due to a fixed ratio of turns of the two windings being 1:1 as the coupled winding and the negative voltage winding are on the same winding. Conversely, the double winding has an advantage of being capable of making adjustments or optimizations through the ratio of turns of the two windings as the coupled winding is independent and separated from the negative voltage winding, and has a disadvantage of increasing the cost of additional winding.

Preferably, with reference to FIGS. 5, 6*a*, and 6*b*, in order to limit a huge inrush current when the second electronic switch Q2 is conducted, a current limiting inductor L1 is disposed between the second electronic switch Q2 and the auxiliary winding, in the embodiment, while using the L1 because an inductor has a lower DCR than a resistor for concerning about the conduction losses, wherein if the current of the switch Q2 does not exceed the limitation, the L1 can be removed and replaced with a short circuit as well to saving the cost. In addition, in order to block the reverse current from passing through a body diode of the second electronic switch Q2, a third diode D3 is disposed between the second electronic switch Q2 and the current limiting inductor L1 in the embodiment, wherein a positive electrode of the third diode D3 is electrically connected with the current limiting inductor L1 and a negative electrode of the third diode D3 is connected with the second electronic switch Q2; as such, the current is only allowed to flow from the current limiting inductor L1 to the second electronic switch Q2 while the current is blocked from flowing reversely, so that the reverse current is blocked from passing through the body diode of the second electronic switch Q2; the purpose of blocking the reverse current is to reduce additional conduction losses to improve the conversion efficiency, if there is no concerning about the reverse current, the D3 may also be eliminated and be replaced with short circuit.

Preferably, with reference to FIGS. 5, 6*a*, and 6*b*, in order to satisfy the working requirements for the controller to drive the second electronic switch, the second switch unit further includes a drive resistor Rg, a drive capacitor Cd and a current limiting resistor Rd, wherein a control end of the second electronic switch Q2 is electrically connected with one ends of the drive resistor Rg and the drive capacitor Cd respectively, and the other end of the drive resistor Rg is electrically connected with the positive electrode of the second diode D2, the other end of the drive capacitor Cd being electrically connected with the controller via the current limiting resistor Rd; and wherein the drive resistor Rg and the drive capacitor Cd achieve the effective driving of the second electronic switch performed by the controller, and the current limiting resistor Rd achieves the protection of limiting the drive current from being excessive.

With reference to FIG. 5, the first switch unit 2 of the embodiment includes a first electronic switch Q1 and a second resistor Rcs; one end of the input winding Np is electrically connected with an enable end PWM1 and CS of the controller 1 and one end of the second resistor Rcs via the first electronic switch Q1 respectively, and the other end of the input winding Np accesses a power source (the power source accessed in the embodiment is obtained by the AC voltage passing through the bridge rectifier, and actually may also be obtained by other ways, which is not limited here), the other end of the second resistor Rcs is connected to primary-side ground, wherein the second resistor Rcs is configured to convert a current signal passing through the first electronic switch Q1 into a voltage signal, and the controller 1 is further configured to perform control detection and protection on the first electronic switch Q1 according to the voltage signal. Specifically, the controller of the embodiment adopts a pulse width modulation control (PWM) chip, and CS pins of the control chip are configured to detect the level of the current passing through the Q1 and convert the current signal of the Q1 into the voltage signal through the Rcs, wherein once the Q1 is in the short circuit, is overloaded or acts abnormally, the control chip may interrupt or limit the drive signal of the PWM1 to protect the safety of the system.

With reference to FIG. 5, the embodiment further includes a feedback compensation unit 4 in signal connection with the controller 1, wherein the feedback compensation unit 4 is configured to real time sense the output voltage from output winding Ns of the voltage converter, and the controller 1 is further configured to modulate the pulse width of the first control signal PWM1 according to the output voltage. Preferably, in the embodiment, an optical coupler is disposed between the feedback compensation unit and the controller. Specifically, the DC voltage output by the output winding Ns passes through the isolated optical coupler via the feedback compensation unit to transmit the feedback signal to the PWM control chip, and then the chip determines the width of the PWM according to the feedback level to regulate the output voltage stably.

With reference to FIG. 5, the embodiment further includes a power supply unit 5, the power supply unit 5 including a first resistor R1, a first diode D1, and a first capacitor C1, wherein one end of the first resistor R1 is electrically connected with an access power source of the input winding Np, the other end of the first resistor R1 is electrically connected with a negative electrode of the first diode D1, one end of the first capacitor C1 and a power source input port VCC of the controller 1, and a positive electrode of the first diode D1 is electrically connected with a non-earthed end of the auxiliary winding Na, the other end of the first capacitor C1 is connected to primary-side ground. Specifically, the power source accessed by the input winding Np first charges the C1 through the R1 until the VCC reaches the initiating voltage, then the PWM1 begins to drive the Q1 and changes into a square wave voltage via high-speed switching through the frequencies of the converter TX and the Q1, and then the square wave voltage is converted to the secondary side and becomes the direct current voltage again after the rectification and the filtration of the secondary side to be output. At this time, the auxiliary winding Na is also coupled to the voltage, and then the voltage charges the C1 through the D1 for the VCC of the controller to use, so as to reduce the losses caused by providing the VCC with the R1.

With reference to FIG. 5, the embodiment further includes an energy storage capacitor C_Bulk, wherein one end of the energy storage capacitor C_Bulk is electrically connected with one end of the access power source of the input winding Np, and the other end of the energy storage capacitor C_Bulk is connected to primary-side ground. Specifically, with the energy storage capacitor, when the negative current is generated by the input winding, the released energy from the first switching unit will be recovered and released again in the next operating cycle, thereby saving energy waste and improving the conversion efficiency of the voltage-converter.

With the combination of the float-switch circuit structure of the embodiment, the working principle and the functions achieved will be described in detail as follows.

Figure 7:
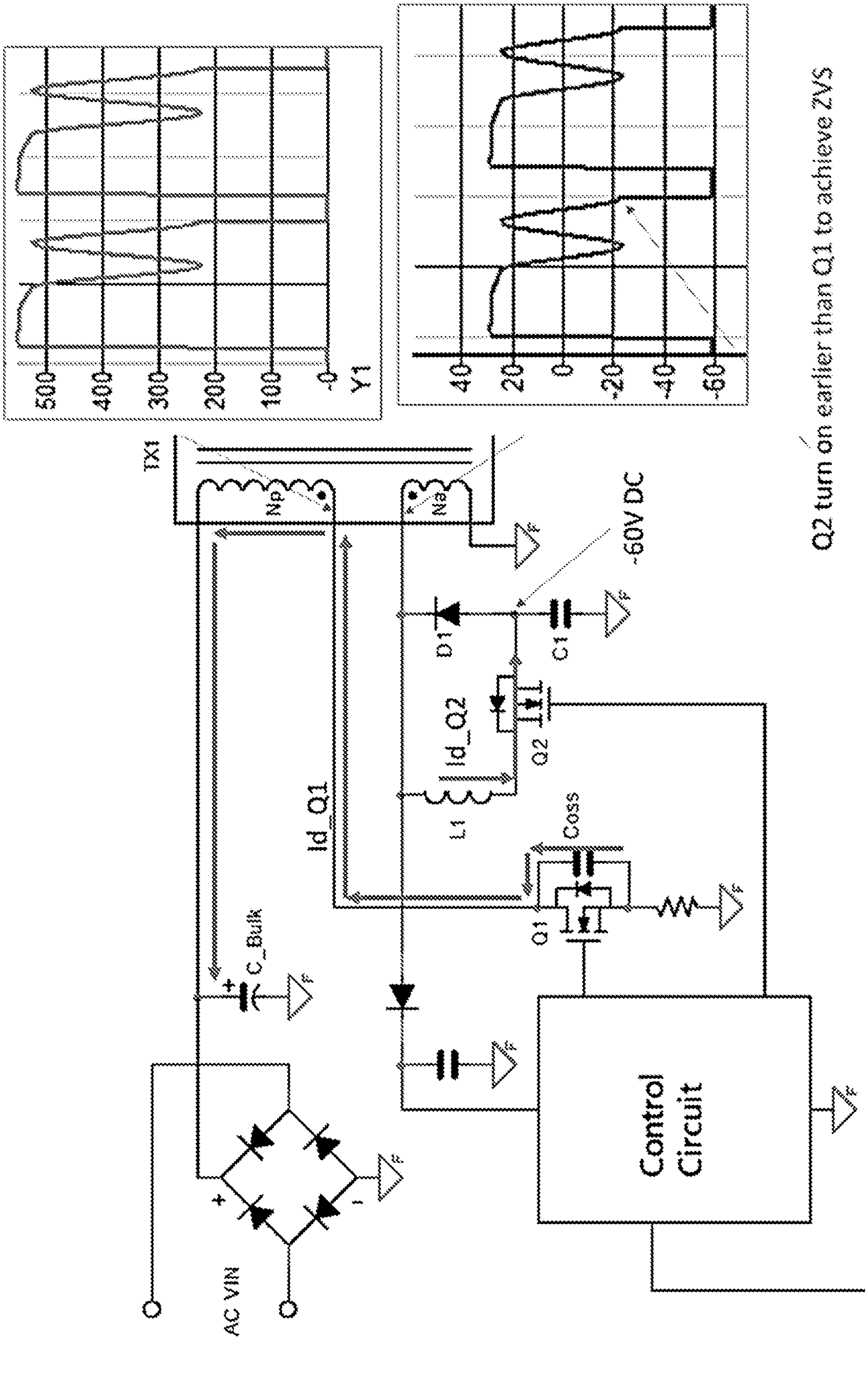
FIG. 7 is a diagram of a working principle and a waveform corresponding to the circuit structure shown in FIG. 5.

With reference to FIG. 7, the primary circuit of the embodiment consists of the Q2, the L1, the D3 and the D2, and the C2. The primary circuit is connected to the auxiliary winding that originally exists, with a waveform in the form of a coupled waveform of the Vds and different levels for the positive voltage and the negative voltage. We use the negative voltage waveform, through the D2, to be rectified into a direct current negative voltage (DC−) by the C2, i.e., the negative voltage level. Meanwhile, the Q2 and the L1 are also connected to the auxiliary winding.

With reference to FIG. 7, the control for the conduction between the Q1 and the Q2 are as follows:

when the converter completes the output of an entire cycle and before the moment of Q1 gets ready to turn on, the Q2 turns on one step ahead; once the Q2 turns on, the waveform on the auxiliary winding is immediately connected with the negative DC voltage rectified in advance, wherein since the negative DC voltage has a capacitor-filtered stable voltage, the waveform on the auxiliary winding located at a higher potential will be pulled down to the level of the negative DC voltage, i.e., the negative voltage level;

this negative voltage level is a negative voltage for the auxiliary winding Na, and is a "zero potential" for the Vds of the input winding Np; therefore, in this moment, pulling the auxiliary winding down to the pre-rectified negative DC voltage is equivalent to discharging and pulling the Vds of the input winding Np down to the "zero potential", i.e., an expected low switching voltage, through the coupling effect. In other words, when the Q2 is conducted, the Np is forced to generate the "negative current" so that the direction of the current Id will flowing upward first, to release the energy of the parasitic capacitance Coss of the Q1 towards the C_Bulk; therefore, this energy is recovered through the C_Bulk, and will be released again for use in the next working cycle.

In this way, before the Q1 is switched, the cross voltage of the Q1 may be reduced to the expected low switching voltage for reducing the switching losses, wherein the expected switching voltage may be determined with comprehensive considerations according to practical requirements and performances. In addition, in the embodiment, once the Q1 turns on, the Q2 can be turned-off at once or may extended for a short overlap duration to make sure Q1 conducted totally before Q2 turn-off and the delay time between the Q2 and the Q1 may be set by the controller, such as external resistor or internal pre-set of the controller, according to practical requirement.

Meanwhile, the descriptions in which the present embodiment achieves the function of reducing the switching losses under both DCM and CCM, the embodiment further helps to overcome the challenge in synchronous rectification of CCM operation in the embodiment of Flyback converter, i.e., the challenge of controlling the synchronous rectification is caused by the inherent overlap between the primary-side current and the secondary-side current in cross-over transition region of the transformer.

Figure 1:
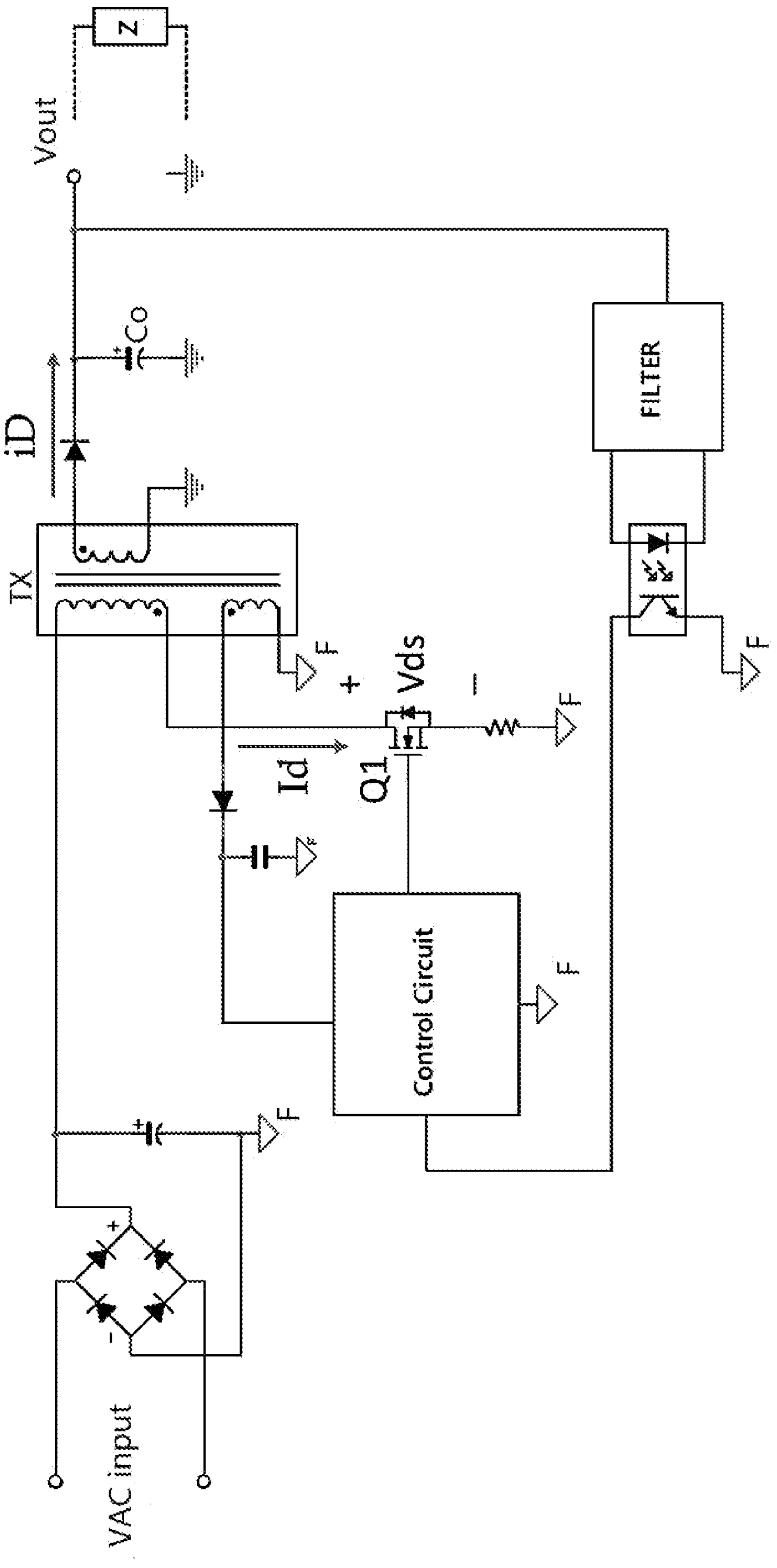
Fig. 1 (Prior Art)
FIG. 1 is a circuit diagram of a voltage converter in the prior art.
Figure 2:
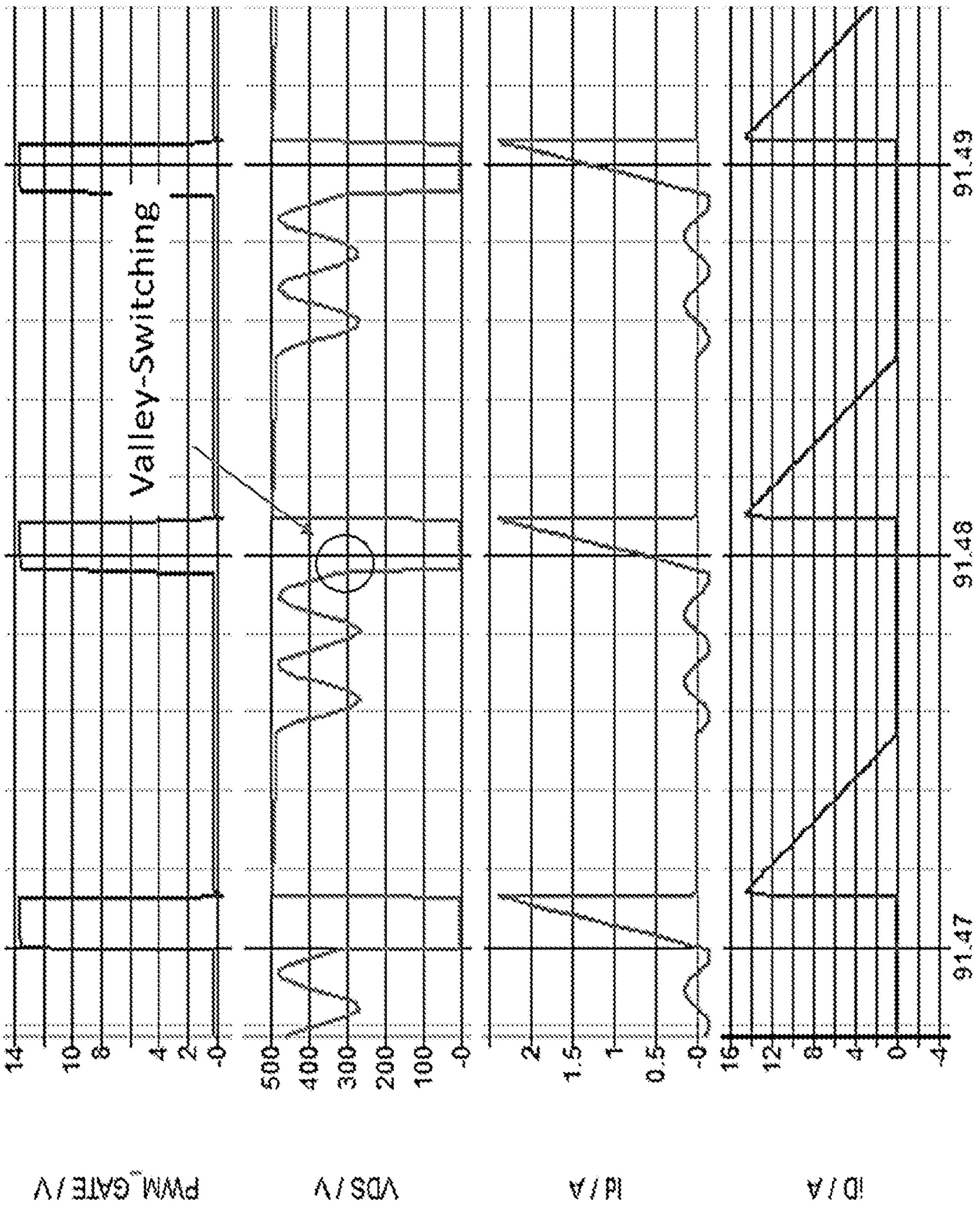
Fig. 2 (Prior Art)
FIG. 2 is a diagram of an operating waveform of valley-switching of the voltage converter in the prior art.
Figure 3:
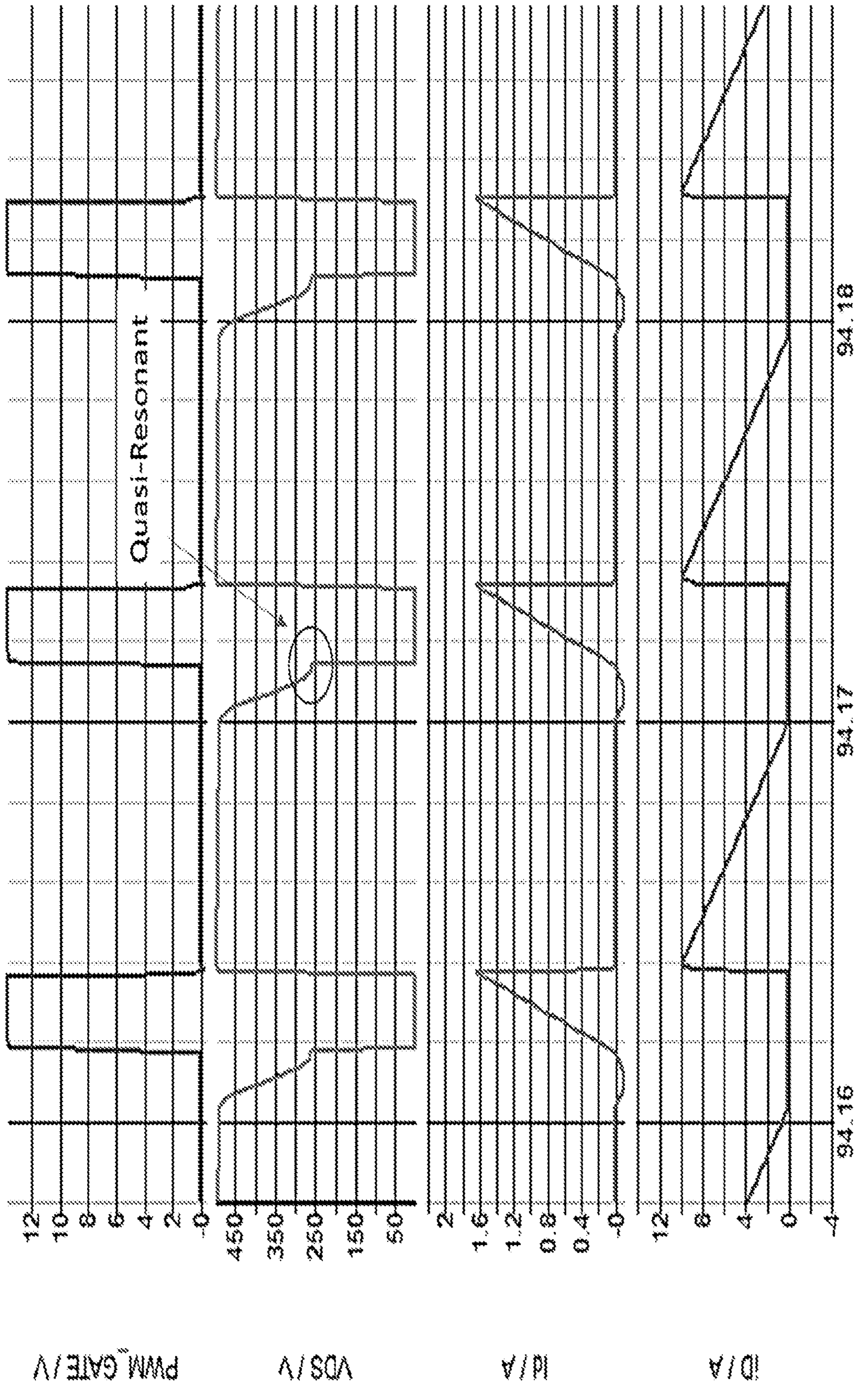
Fig. 3 (Prior Art)
FIG. 3 is a diagram of an operating waveform of Quasi-Resonant (QR) of the voltage converter in the prior art.
Figure 4:
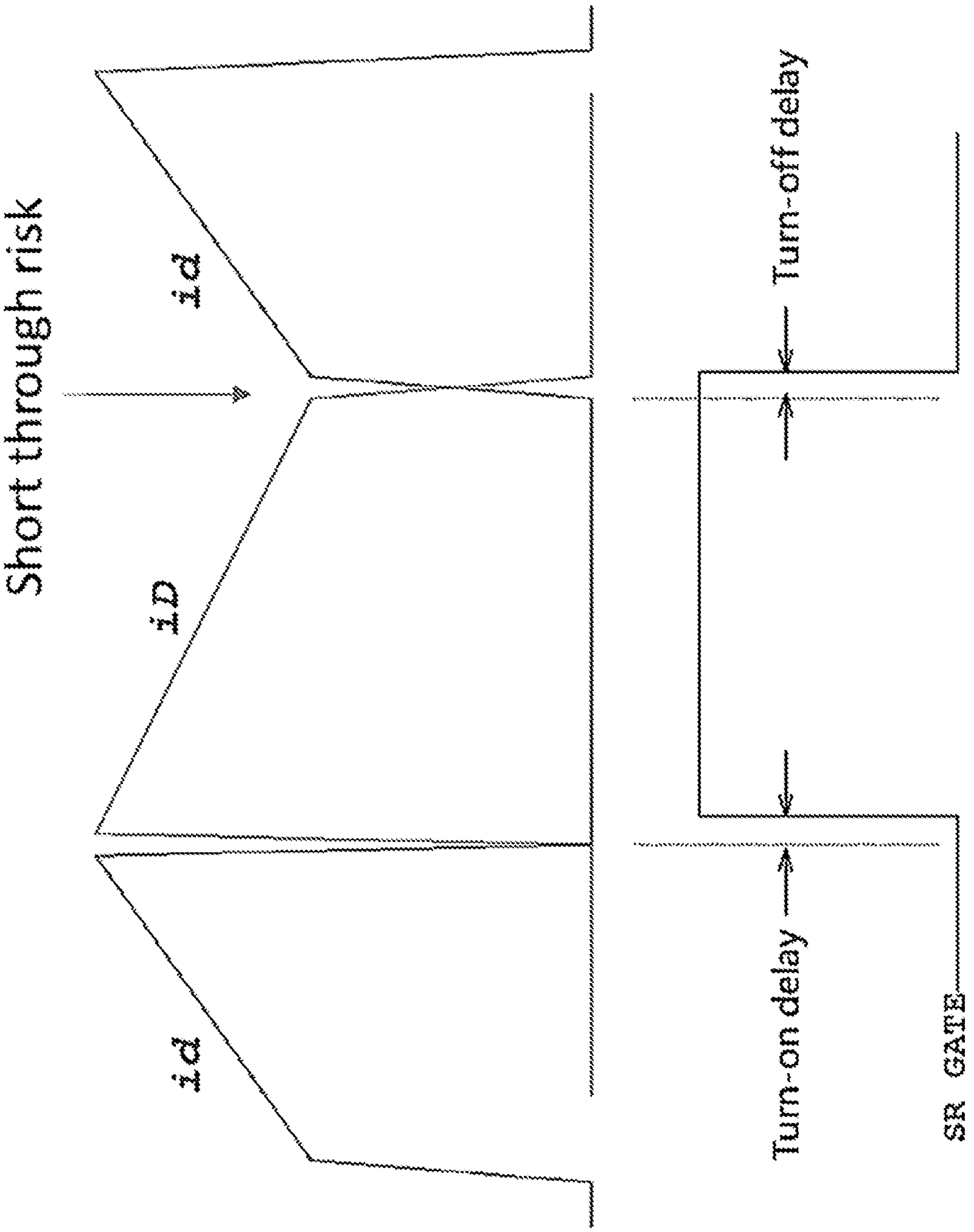
Fig. 4 (Prior Art)
FIG. 4 is a diagram of a phenomenon that is approximate to the short circuit appeared at a cross-conduction region between the primary current and the secondary current in the voltage converter in the prior art.

With reference to FIG. 4, in normal operations under the CCM, a transient Overlap phenomenon can happen in the cross-over region between the primary-side current Id and the secondary-side current iD; therefore, for the synchronous rectification SR of the secondary side, it is hard to determine the turn-off timing of SR MOSFET, wherein if the timing too early, the efficiency performance is not satisfactory, and if the turn-off timing too late, the cross conduction issue would be happened.

Typically prior art to address the described cross-conduction: the SR controller IC requires a very short turn-off delay rely on a very strong driving ability as well as very short turn-off propagation delay; And reduce the driving capability to control the turn-on slower of primary-side high-voltage electronic switch (this may increase the additional losses), and also with the cooperation of selecting the SR-MOSFET with smaller Qg (but the Rds_on will most likely be increased accordingly) to speed up the SR-MOSFET turn-off; and also may using a micro offset-voltage which generated by the parasitic inductance on the SR-MOSFET pins so that SR controller IC detects the offset-voltage moment earlier than real threshold to turn-off the SR-MOSFET in order to avoid reach the cross-conduction region; and also the SR gate-driving with linear drop mode is used to reduce the driving voltage in advance in order to push the SR-MOSFET turn-off faster. These methods are all used for earlier or faster turning-off to avoid or improve the cross-conduction symptom, however, some of the above actions are performed with the efficiency sacrificed and a complex control algorism of SR controller may be required.

Figure 8:
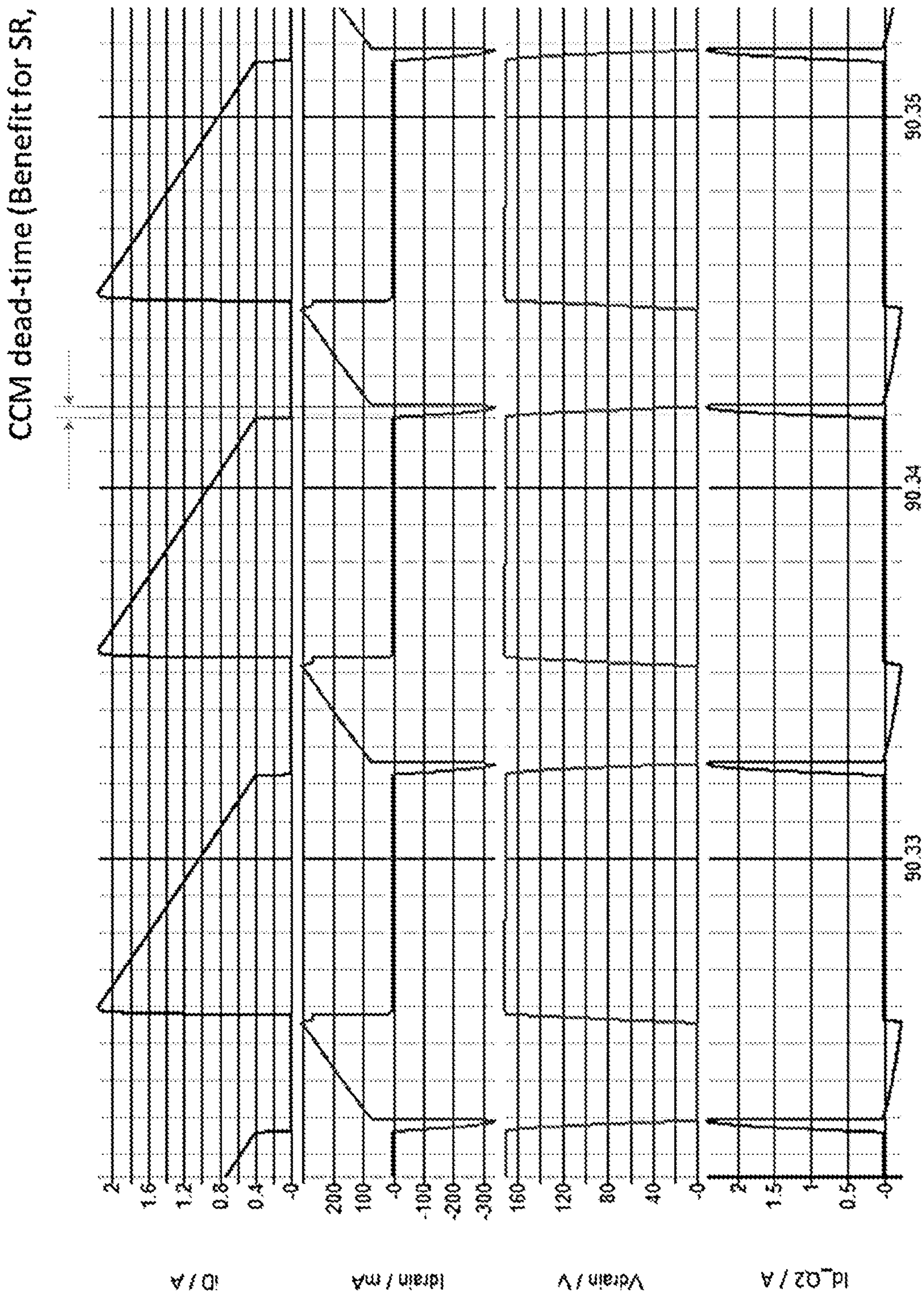
FIG. 8 is a diagram of the operating waveform of the novel zero-voltage switching control circuit according to an embodiment of the invention.
Figure 9:
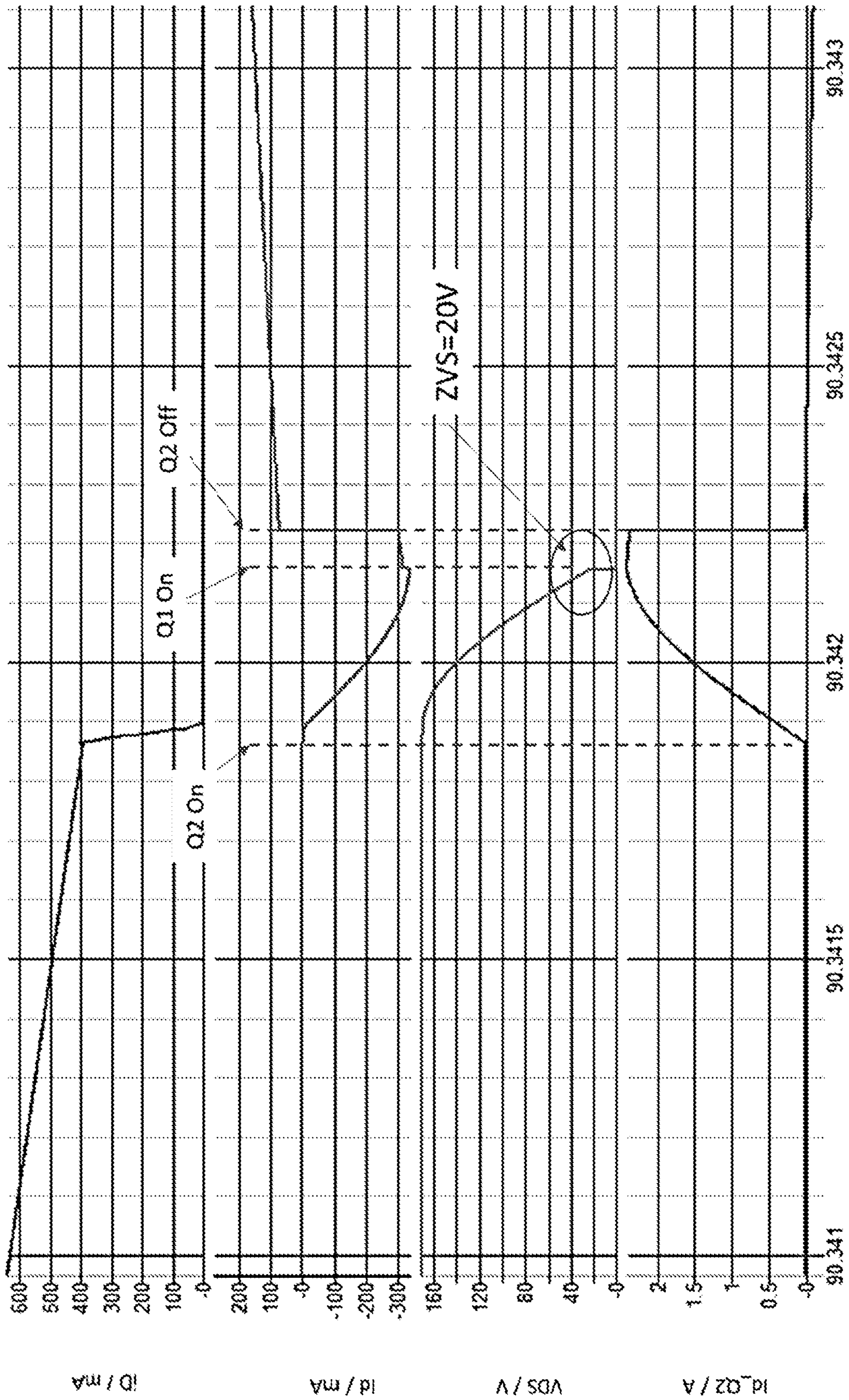
FIG. 9 is a partial enlarged diagram of the operating waveform shown in FIG. 8.

With reference to FIGS. 8 and 9, the zero-voltage switching control circuit proposed by the embodiment improves that creates a delay time to separate the Id of the primary-side from the iD of the secondary-side that are originally overlap in cross-over region, so that the SR-MOSFET can be fully turned-on and well perform the rectification efficiency without the concerning about the described overlap symptom and cross conduction risk.

Figure 10:
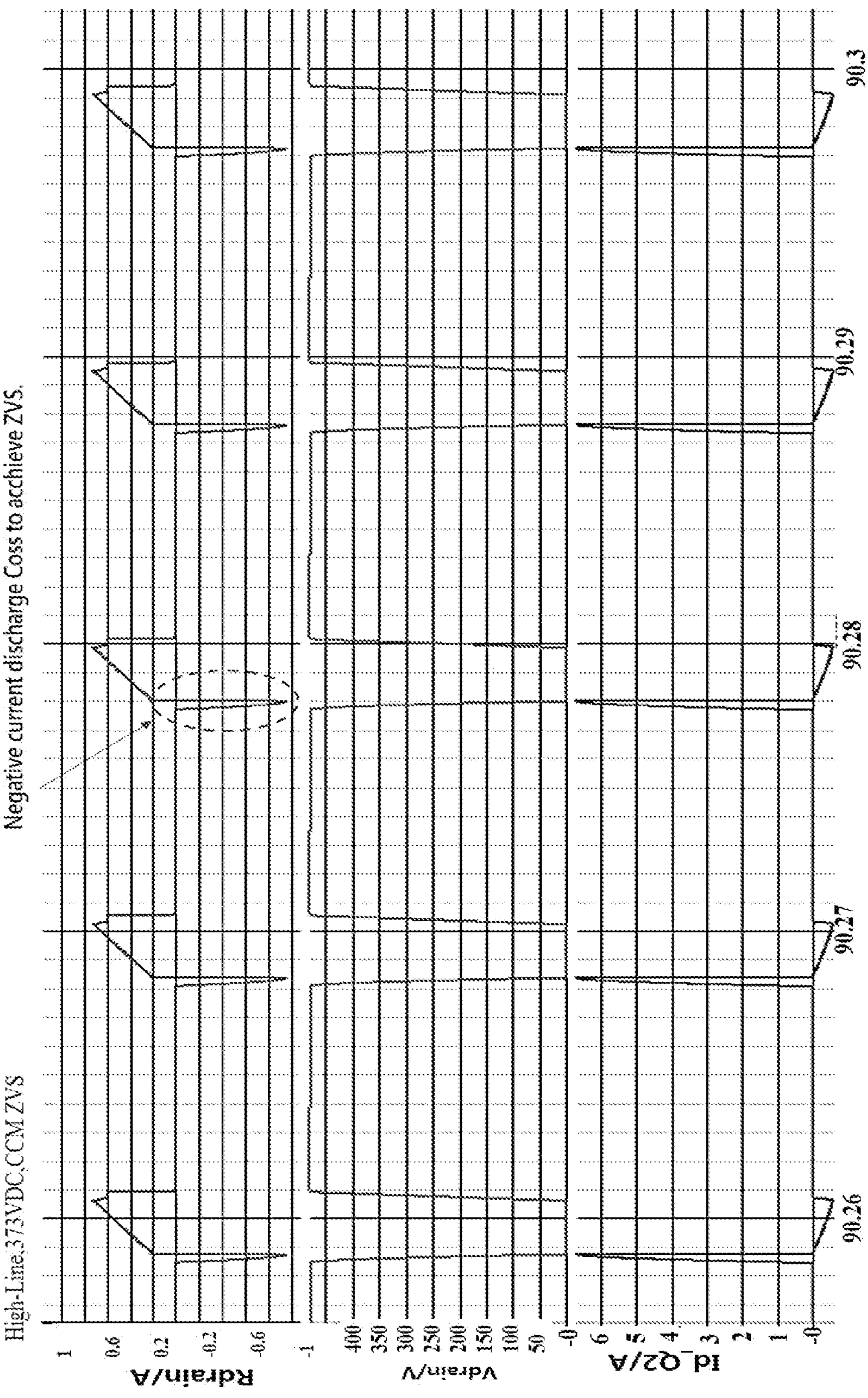
FIG. 10 shows high-voltage simulation waveform results of the novel zero-voltage switching control circuit under the CCM mode according to an embodiment of the invention.
Figure 11:
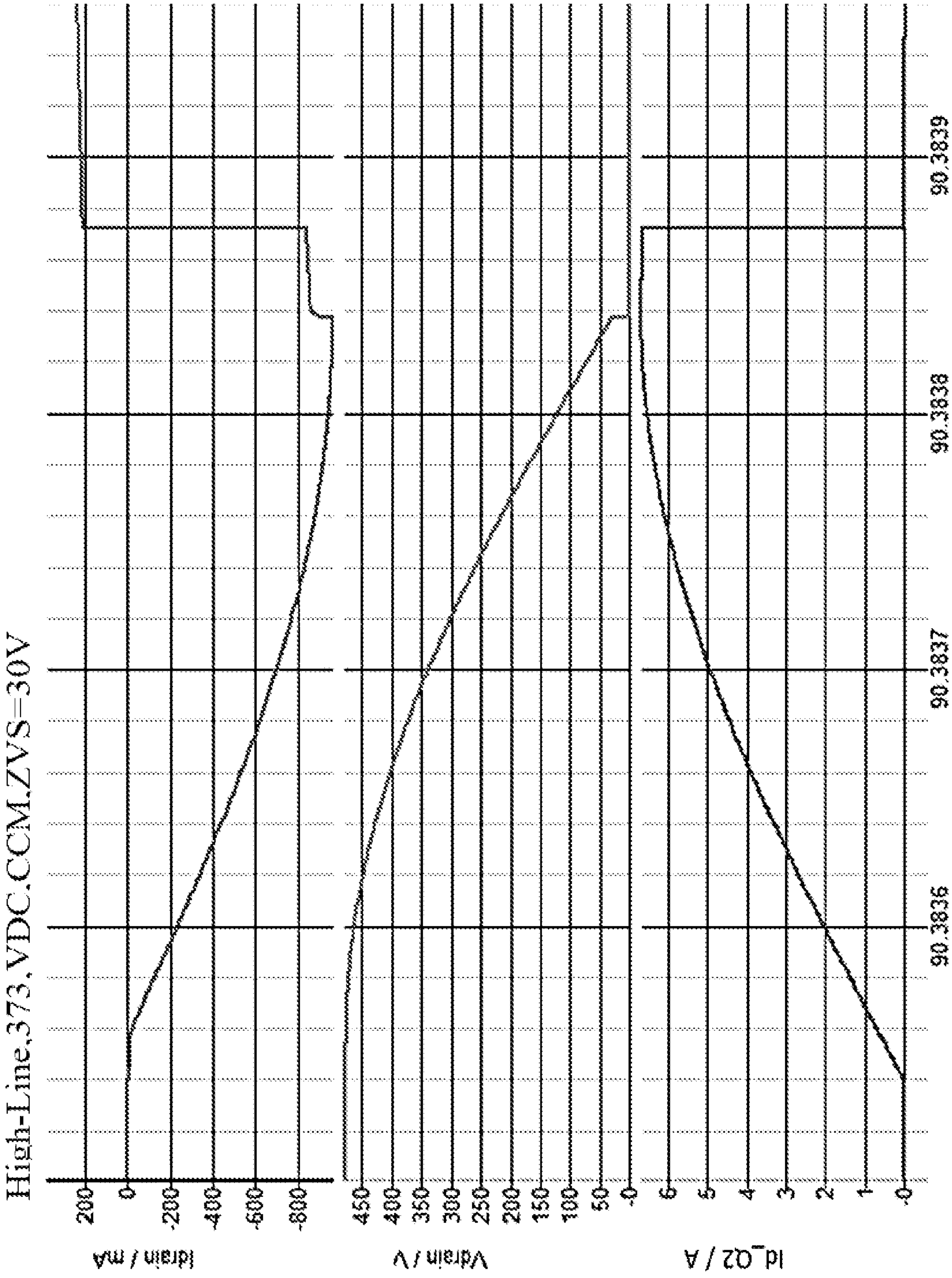
FIG. 11 is a partial enlarged diagram of the waveform results shown in FIG. 10.
Figure 12:
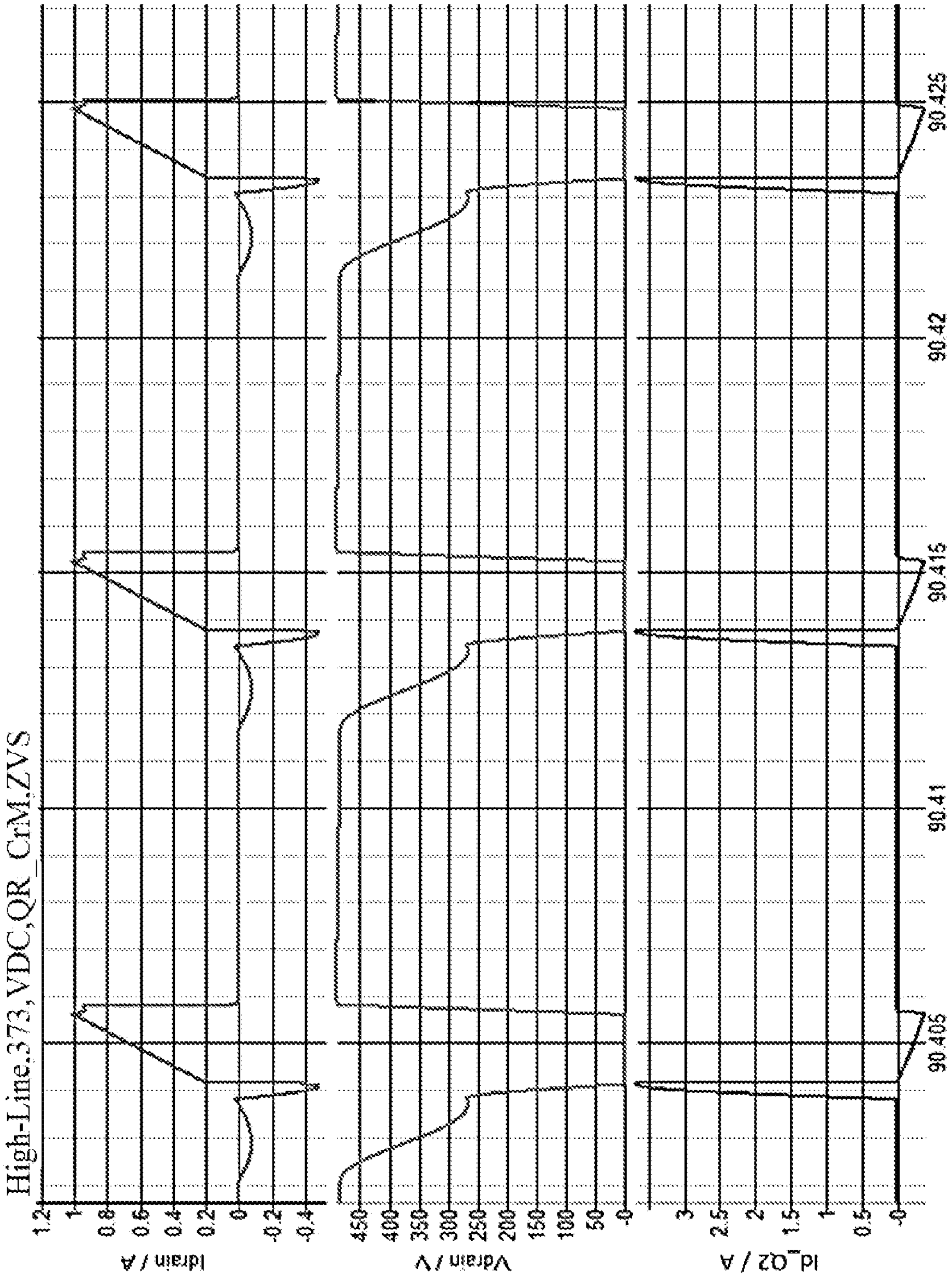
FIG. 12 shows high-voltage simulation waveform results of the novel zero-voltage switching control circuit under the DCM mode according to an embodiment of the invention.
Figure 13:
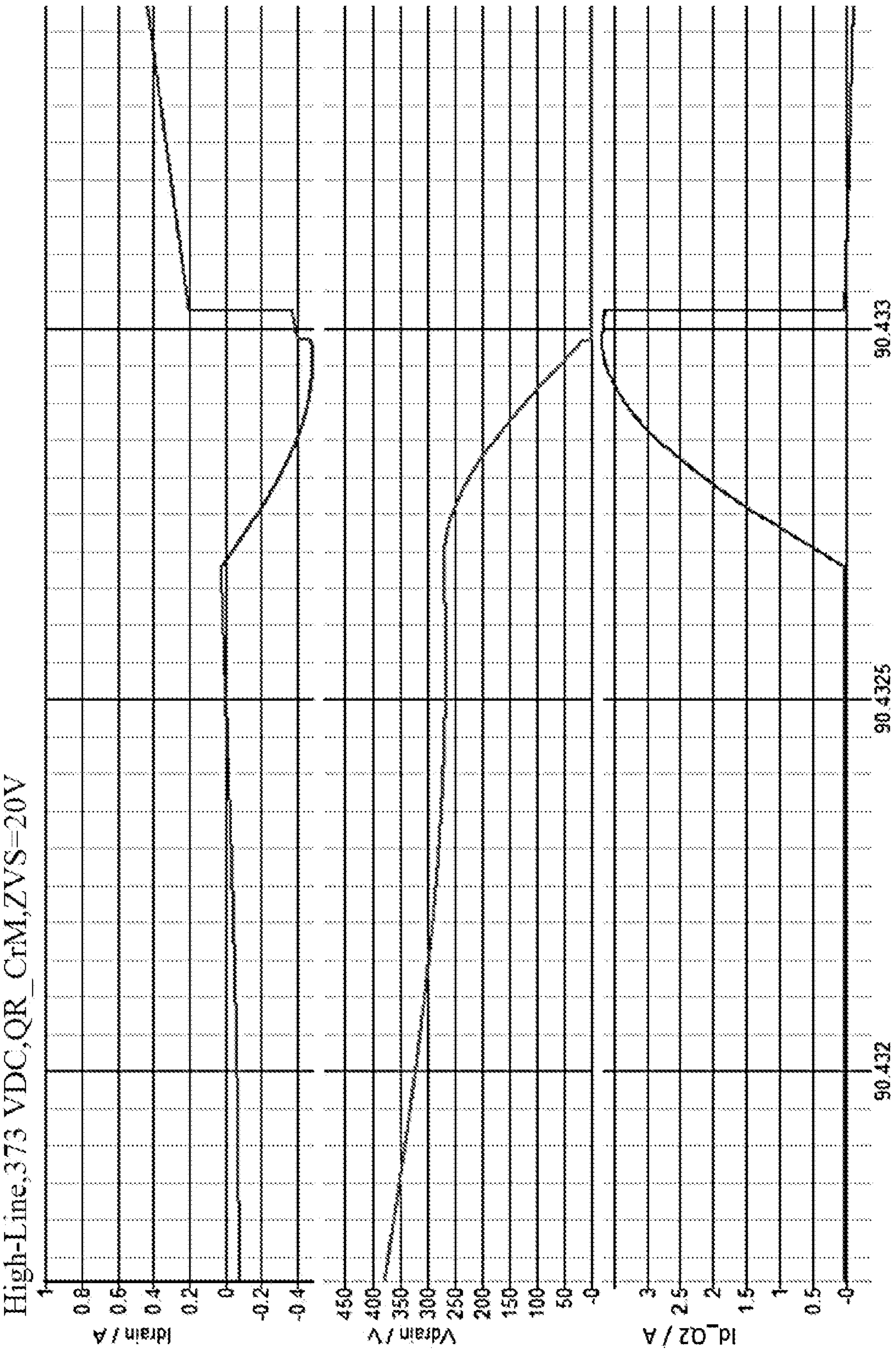
FIG. 13 is a partial enlarged diagram of the waveform results shown in FIG. 12.

In the embodiment, tests in which the converter is operated under two modes of the CCM and the DCM have been performed for the above controller, wherein as shown in FIGS. 10 and 11, the CCM may well perform the operation of zero-voltage switching under a high voltage of 264 Vac (264 $\sqrt{2}$=373 VDC), and as shown in FIGS. 12 and 13, the DCM may also well perform the operation of zero-voltage switching under a high voltage of 264 Vac (264 $\sqrt{2}$=373 VDC). Therefore, the above situation explained that the zero-voltage switching control circuit of the embodiment can be achieved in both the two operation modes of the DCM and the CCM so as to reduce the switching losses.

Figure 14A:
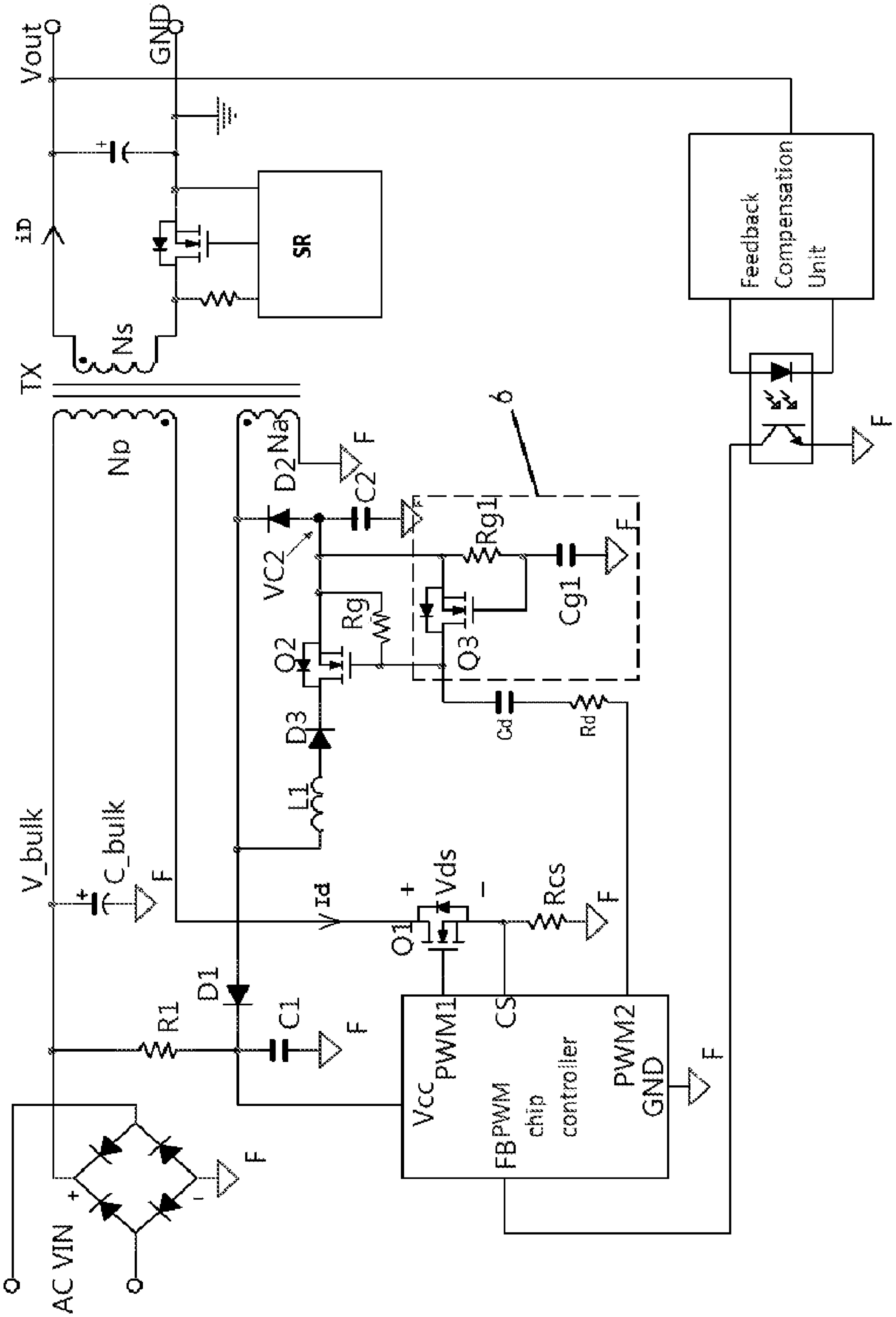
FIGS. 14*a* and 14*b* are a structural diagrams of an offset clamp unit of the novel zero-voltage switching control circuit according to an embodiment of the invention.
Figure 14B:
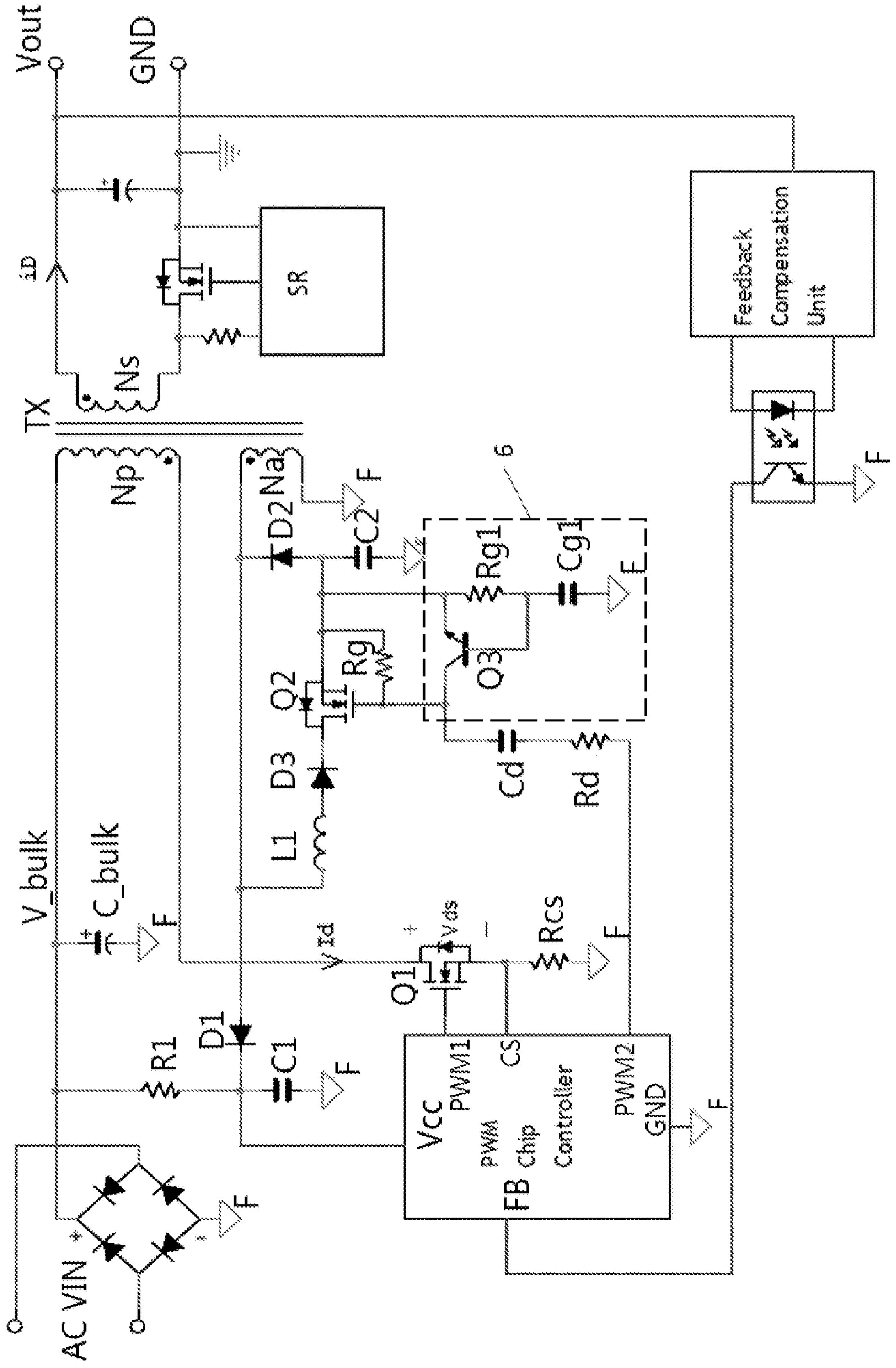

Preferably, with reference to FIG. 14*a* and FIG. 14*b*, the embodiment further includes an offset clamp unit 6 to optimize the drive circuit of the second electronic switch Q2, and the offset clamp unit 6 includes a second electronic switch Q3, a clamp resistor Rg1 and a clamp capacitor Cg1, wherein one end of the third electronic switch Q3 is electrically connected with the control end of the second electronic switch Q2, the other end of the third electronic switch Q3 is electrically connected with the positive electrode of the second diode D2 and one end of the clamp resistor Rg1 respectively, and a control end of the third electronic switch Q3 is electrically connected with the other end of the clamp resistor Rg1 and one end of the clamp capacitor Cg1 respectively, the other end of the clamp capacitor Cg1 is connected to primary-side ground.

In some embodiments, the Q3 could be a electronic switch, which can be a NMOSFET or NPN-BJT, their function and behavior are the similar in the offset clamp circuit.

Figure 15:
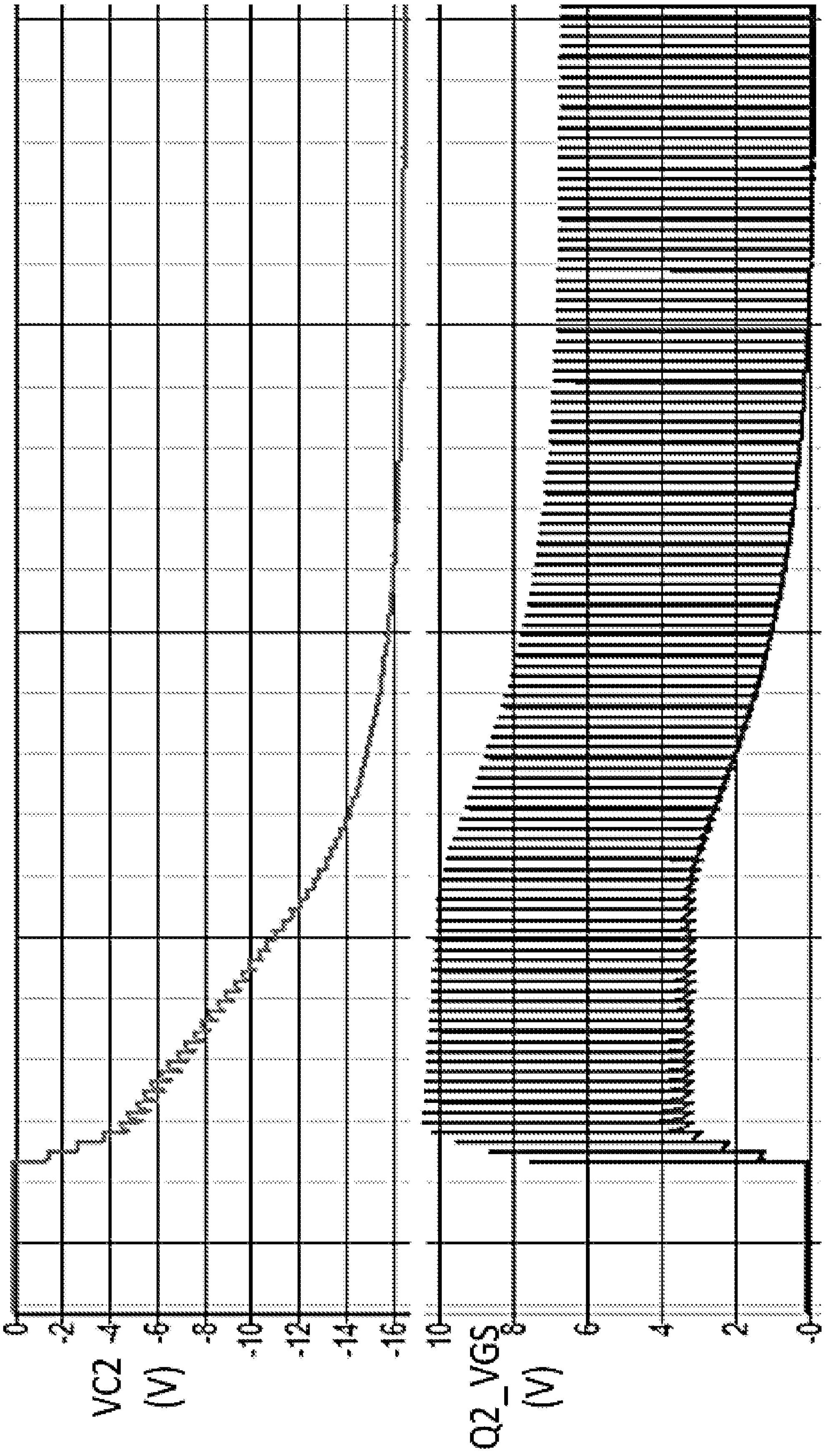
FIG. 15 shows the original scenario in which the Q2_VGS in the circuit structure shown in FIG. 5 generates an offset potential.
Figure 16:
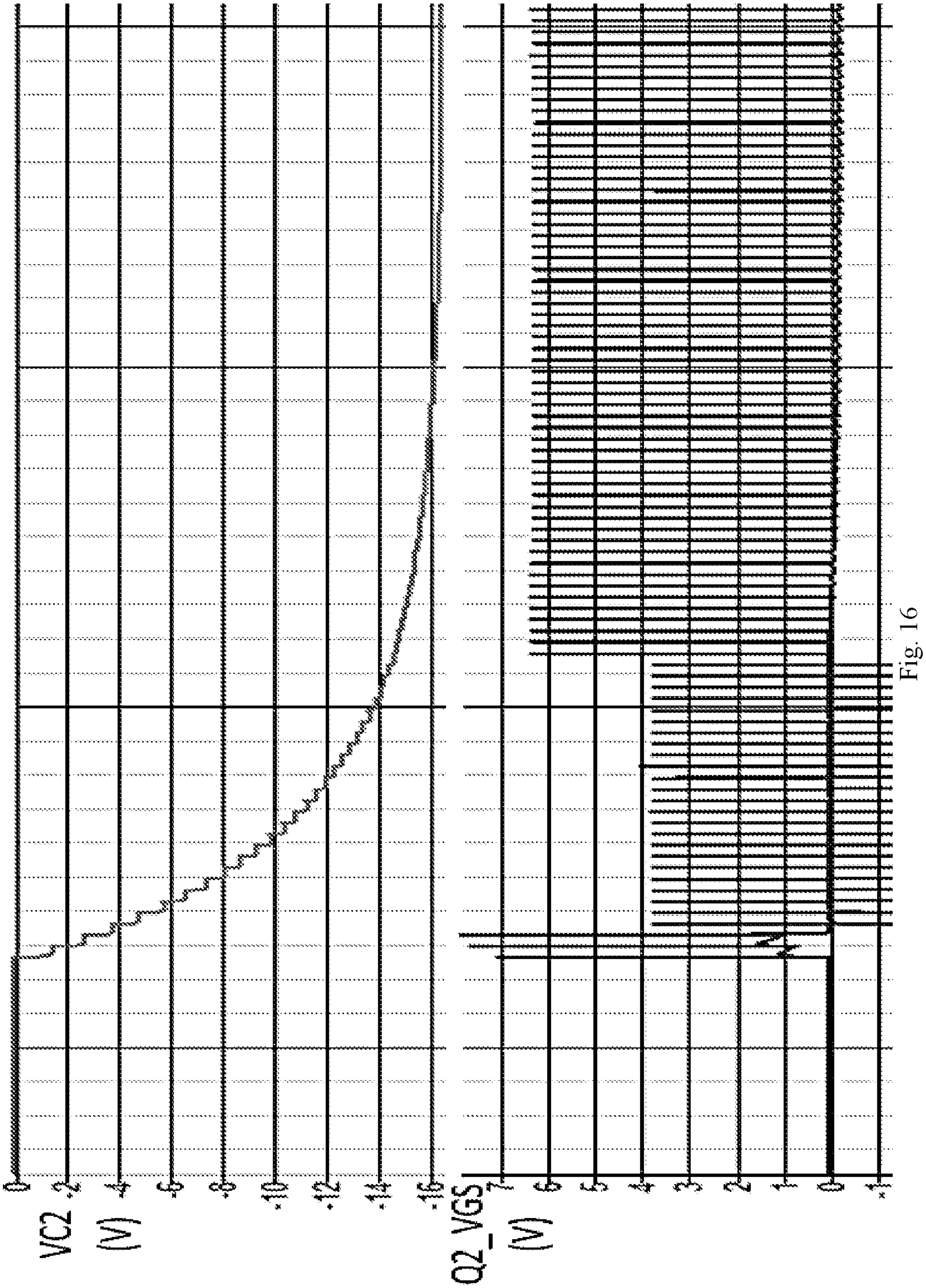
FIG. 16 shows a scenario in which the Q2_VGS is improved after the offset clamp unit is added to the circuit structure shown in FIG. 14.

Specifically, with reference to a situation where the Q2_VGS generates the offset potential shown in FIG. 15, since the potential of the C2 is zero before the system is initiated, the potential of the C2 will begin to decrease from zero to generate the negative voltage in the moment of initiating the system; in this short period of time, the second electronic switch Q2 will cause VGS to generate the offset potential (Offset Voltage) because its G-end still maintains at a zero potential and the G-end potential is then higher than the S-end potential. Therefore, in the embodiment, the offset clamp unit consisting of the Q3, the Rg1, and the Cg1 is configured to improve this situation, wherein when the above offset potential is generated, the Q3 is conducted when the offset potential is generated and further the offset potential of the Q2_VGS is eliminated by the adjustments of the Rg1 and the Cg1 time constant, so that the Q2 is prevented from appearing a risk of temporary mis-conduction, as shown by the situation where the offset clamp unit is improved in FIG. 16. Further, the clamp circuit is suitable for the connection type of the second electronic switch Q2 in the FIGS. 5, 6*a*, and 6*b* in the embodiment, which will not be repeated here.

Similar to the functions of the circuit structure in which the second switch unit adopts the float-switch single winding and the float-switch double winding mentioned above, in a third embodiment, the second switch unit adopts the circuit structure of the ground-switch type, which includes a second electronic switch Q2 and a second capacitor C2, and the auxiliary winding is a single winding; one end of the second capacitor C2 is electrically connected with one end of the auxiliary winding, the other end of the auxiliary winding is connected to primary-side ground, and the other end of the second capacitor C2 is connected to primary-side ground via the second electronic switch Q2. Preferably, with reference to FIG. 17, the second switch unit 3 further includes a current limiting inductor L1, a second diode D2, and a third diode D3 that are disposed between the second capacitor C2 and the auxiliary winding; a positive electrode of the second diode D2 and a negative electrode of the third diode D3 are electrically connected with the second capacitor C2, a negative electrode of the second diode D2 is electrically connected with the auxiliary winding, and a positive electrode of the third diode D3 is electrically connected with the auxiliary winding via the current limiting inductor L1, wherein the current limiting inductor L1 is configured to limit a inrush current level passing through the second electronic switch Q2.

Figure 18A:
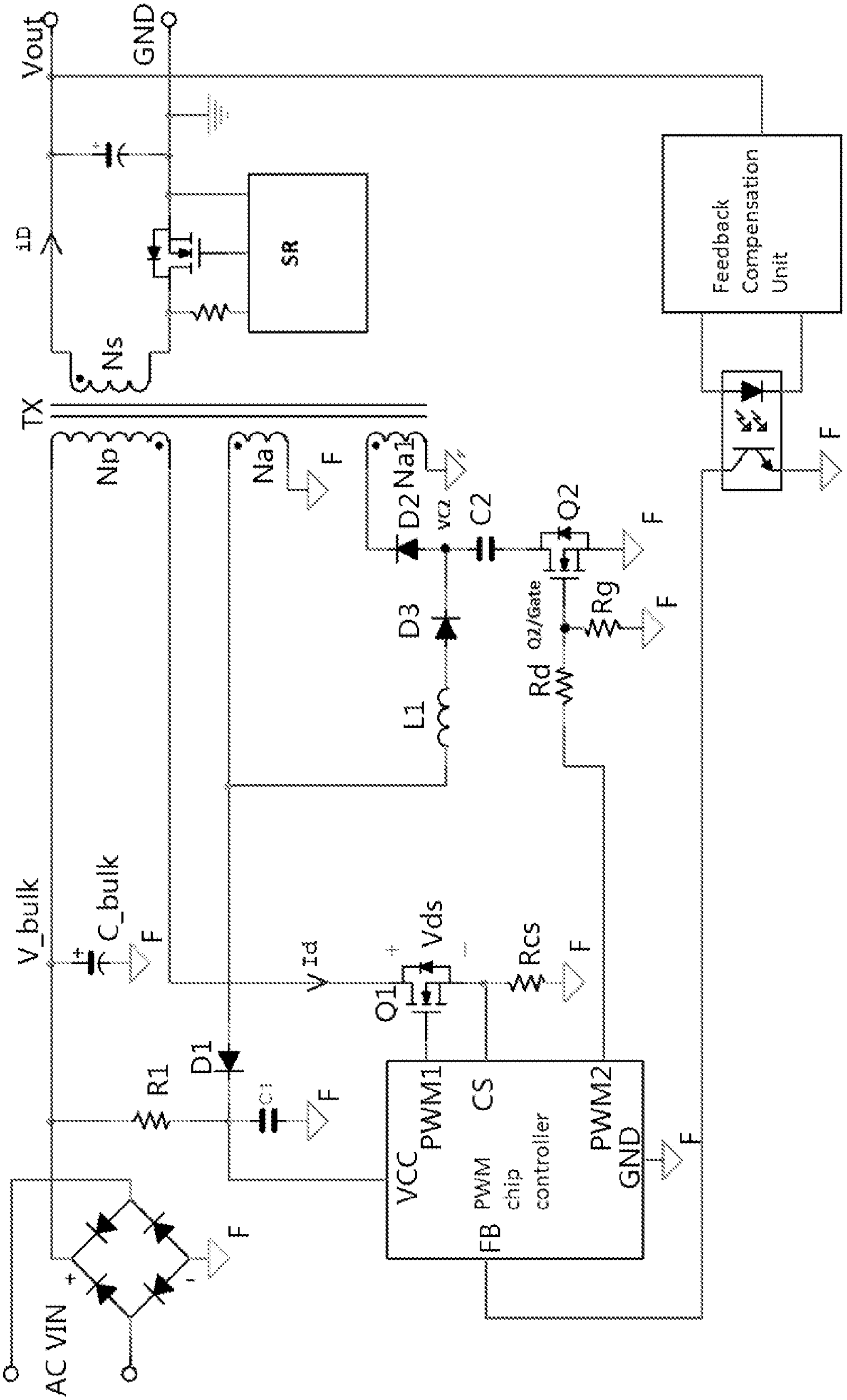
FIGS. 18*a* and 18*b* are structural diagrams of a ground-switch double winding of a novel zero-voltage switching control circuit according to an embodiment of the invention.
Figure 18B:
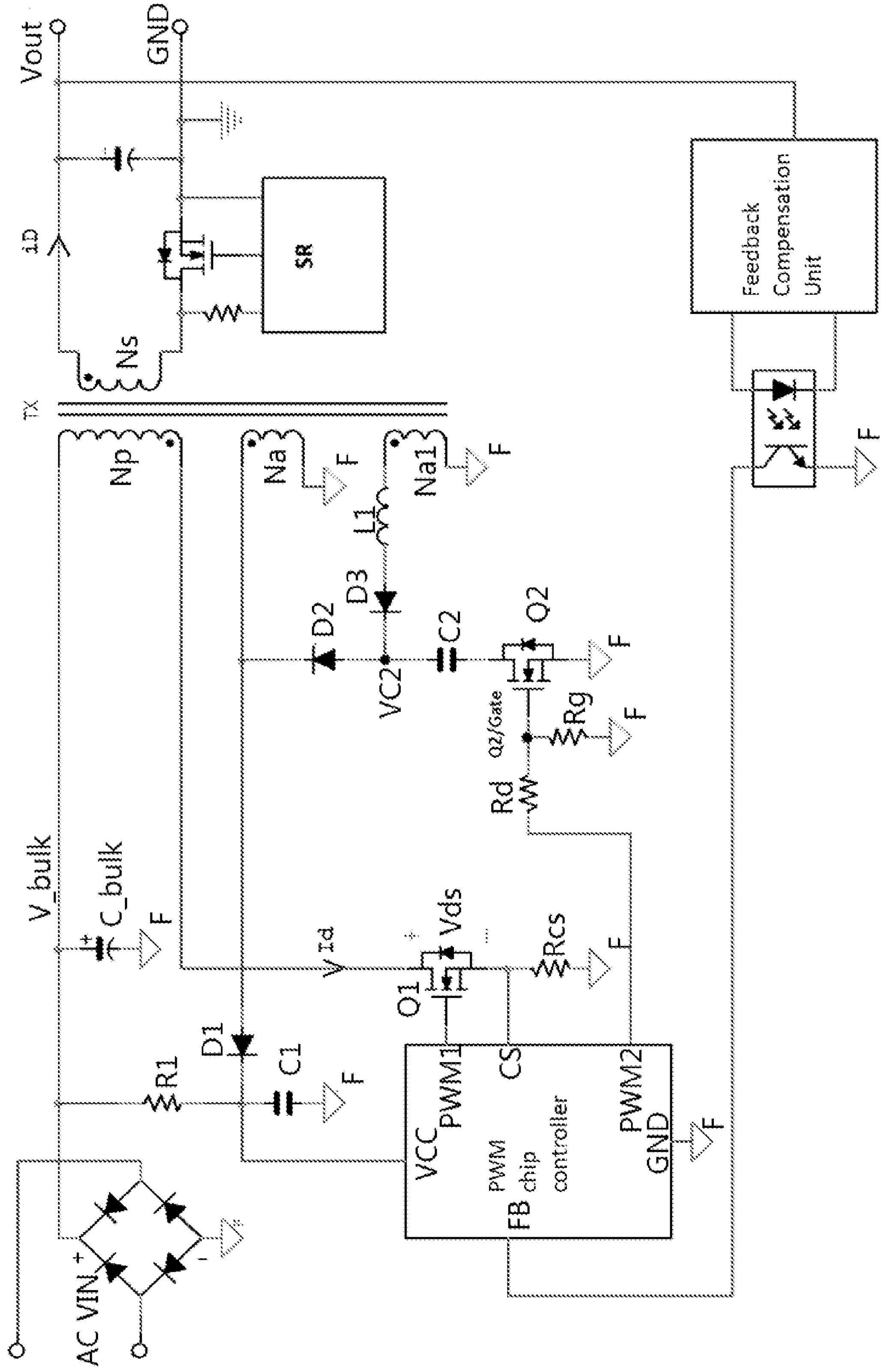

With reference to FIGS. 18*a*~18*b*, in a fourth embodiment, the second switch unit 3 of the embodiment adopts a ground-switch double winding circuit structure, wherein there may also two auxiliary windings in the embodiment, i.e., a coupled winding and a negative voltage winding, and as shown in the figures, the second switch unit of the embodiment also includes the second electronic switch Q2, the second diode D2, the second capacitor C2, and the third diode D3.

Specifically, with reference to FIG. 18*a*, the negative electrode of the second diode D2 is electrically connected with one end of the negative voltage winding Na1, and the other end of the negative voltage winding Na1 is connected to primary-side ground; the positive electrode of the second diode D2 and the negative electrode of the third diode D3 are electrically connected with one end of the second capacitor C2, and the positive electrode of the third diode D3 is electrically connected with one end of the coupled winding Na; the other end of the coupled winding Na is connected to primary-side ground, and the other end of the second capacitor C2 is connected to primary-side ground via the second electronic switch Q2, wherein the node between the second diode D2 and the second capacitor C2 is configured to generate the negative voltage level.

Specifically, with reference to FIG. 18*b*, it differs from the structure shown in FIG. 18*a* in the way in which the second switch unit is connected with the coupled winding and the negative voltage winding, but is the same as the circuit principle shown in FIGS. 18*a* and 18*b* naturally, wherein the negative electrode of the second diode D2 is electrically connected with one end of the negative voltage winding Na, and the other end of the negative voltage winding Na is connected to primary-side ground; the positive electrode of the second diode D2 and one end of the second capacitor C2 are electrically connected with the negative electrode of the third diode D3, and the positive electrode of the third diode D3 is electrically connected with one end of the coupled winding Na1; the other end of the coupled winding Na1 is connected to primary-side ground, and the other end of the second capacitor C2 is connected to primary-side ground via the second electronic switch Q2, wherein the node between the second diode D2 and the second capacitor C2 is configured to generate the negative voltage level.

Figure 17:
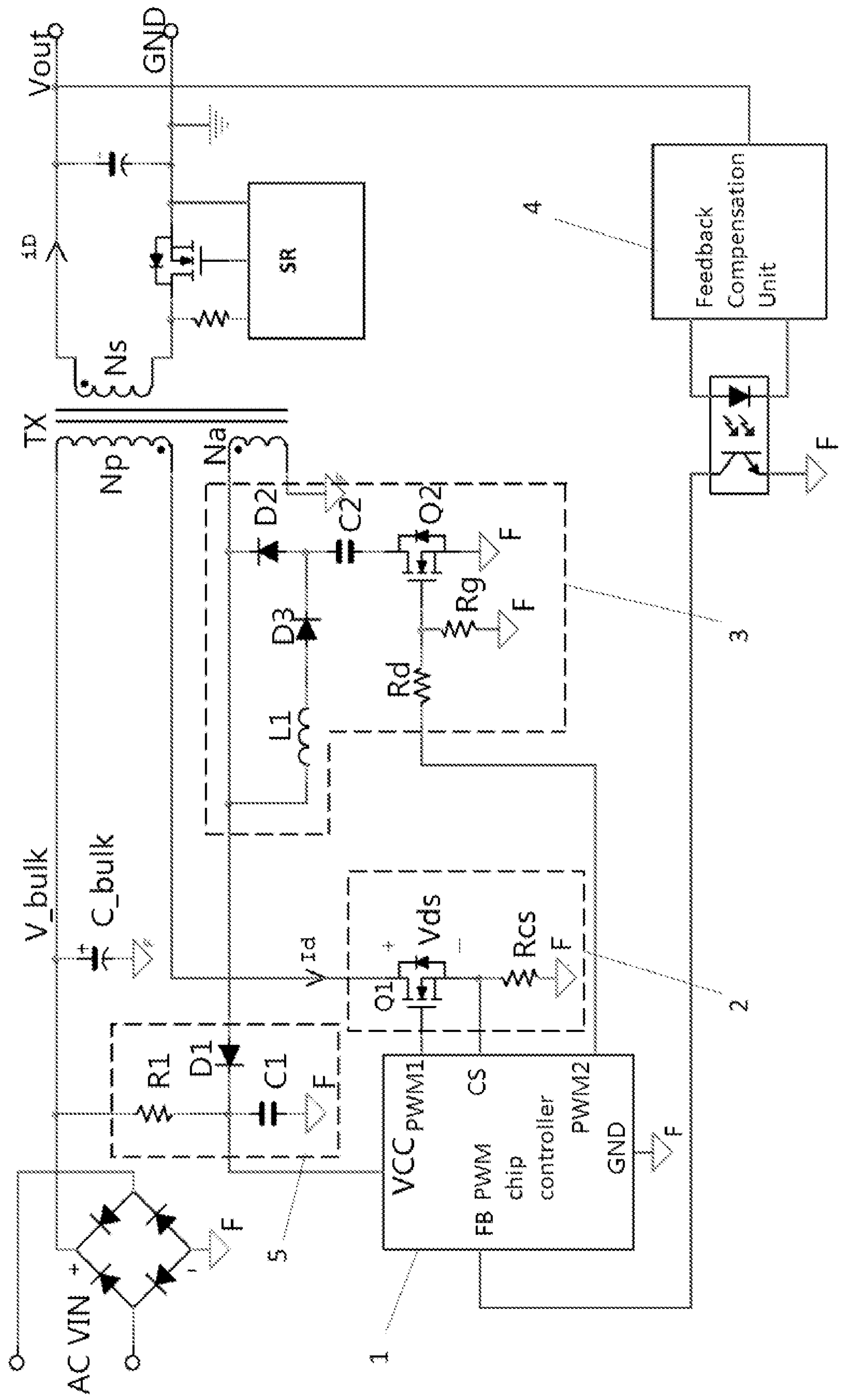
FIG. 17 is a structural diagram of a ground-switch single winding of a novel zero-voltage switching control circuit according to an embodiment of the invention.

With reference to FIGS. 17, 18*a* and 18*b*, the above three different circuit structures may all achieve the conduction between the auxiliary winding and the negative voltage level, and the negative current is generated by the input winding Np based on the coupling effect between the windings to release an energy of a parasitic capacitance Coss in the first switch unit and to connect the input winding Np until the first switch unit is pulled down to an expected low switching potential under the cross voltage Vds for achieving the zero-voltage switching. The single winding has an advantage of reducing the cost of one winding, and has a disadvantage of inability to make possible required adjustments or optimizations due to a fixed ratio of turns of the two windings being 1:1 as the coupled winding and the negative voltage winding are on the same winding. Conversely, as the coupled winding is independent and separated from the negative voltage winding, the double winding has an advantage of being capable of making adjustments or optimizations through the ratio of turns of the two windings, but it has a disadvantage of increasing the cost of one winding.

Preferably, with reference to FIGS. 17, 18*a*, and 18*b*, in order to limit the huge inrush current when the second electronic switch Q2 is conducted, the current limiting inductor L1 is disposed between the second electronic switch Q2 and the auxiliary winding in the embodiment, while the losses may be reduced as the current limiting inductor has a lower DCR as compared with using the current limiting resistor; in addition, in order to block the reverse current from passing through a body diode of the second electronic switch Q2, a third diode D3 is disposed between the second electronic switch Q2 and the current limiting inductor L1 in the embodiment, wherein a positive electrode of the third diode D3 is electrically connected with the current limiting inductor L1 and a negative electrode of the third diode D3 is connected with one end of the second electronic switch Q2; as such, the current is only allowed to flow from the current limiting inductor L1 to the second electronic switch Q2 while the current is blocked from flowing reversely, so that the reverse current is blocked from passing through the body diode of the second electronic switch Q2.

Preferably, with reference to FIGS. 17, 18*a* and 18*b*, in order to satisfy the working requirements of the controller driving the second electronic switch, the second electronic switch further includes a drive resistor Rg and a current limiting resistor Rd; the control end of the second electronic switch Q2 is electrically connected with one ends of the drive resistor Rg and the current limiting resistor Rd respectively, the other end of the drive resistor Rg is connected to primary-side ground, and the other end of the current limiting resistor Rd is electrically connected with the controller. The drive resistor Rg achieves normal switch drive of the second electronic switch Q2 performed by the controller, and the current limiting resistor Rd achieves the protection for preventing the drive limiting current from being too high.

With combination of the ground-switch circuit structure of the embodiment, the working principle and the functions achieved will be described in detail as follows.

With reference to FIGS. 17, 18*a*, and 18*b*, the embodiment here differs from the above float-switch type (FIGS. 5, 6*a*, and 6*b*) only in that the second electronic switch Q2 is placed at ground end of primary-side.

The principle of the behavior is as follows: when the system drives the Q1 to be conducted, a negative voltage waveform is generated on the auxiliary winding, and the Q2 has not been conducted; however, at first, the negative current will pass through the body diode of the Q2 and then flows upward to charge the C2, so that a pre-stored negative voltage is generated cross the two ends of the C2.

When the Q1 is turned off, a positive voltage waveform is formed on the auxiliary winding, and the Q2 having not been conducted and body diode is in a reverse-biased cut-off state, so that the C2 is converted into a floating state; at this moment, the voltage VC2 on the C2 is still the positive voltage to the ground. When the system feedback conditions are met, and before the Q1 begins to be conducted, the Q2 is conducted one step ahead, and then the C2 originally in the floating state is pulled down to the ground by the Q2, so that the voltage of the VC2 is converted to a negative voltage quickly from the positive voltage; therefore, the voltage of the auxiliary winding is pulled down to the expected low negative voltage, and then through the coupled effect between the windings, the negative current is generated by the input winding to release the energy of the parasitic capacitance Coss of the Q1 to be stored into the input large capacitor C_bulk; when the cross voltage Vds of the Q1 is dropped to an expected low level, the controller chip drives the Q1 turn-on at this condition, so as to achieve the purpose of ZVS zero-voltage switching.

Figure 19:
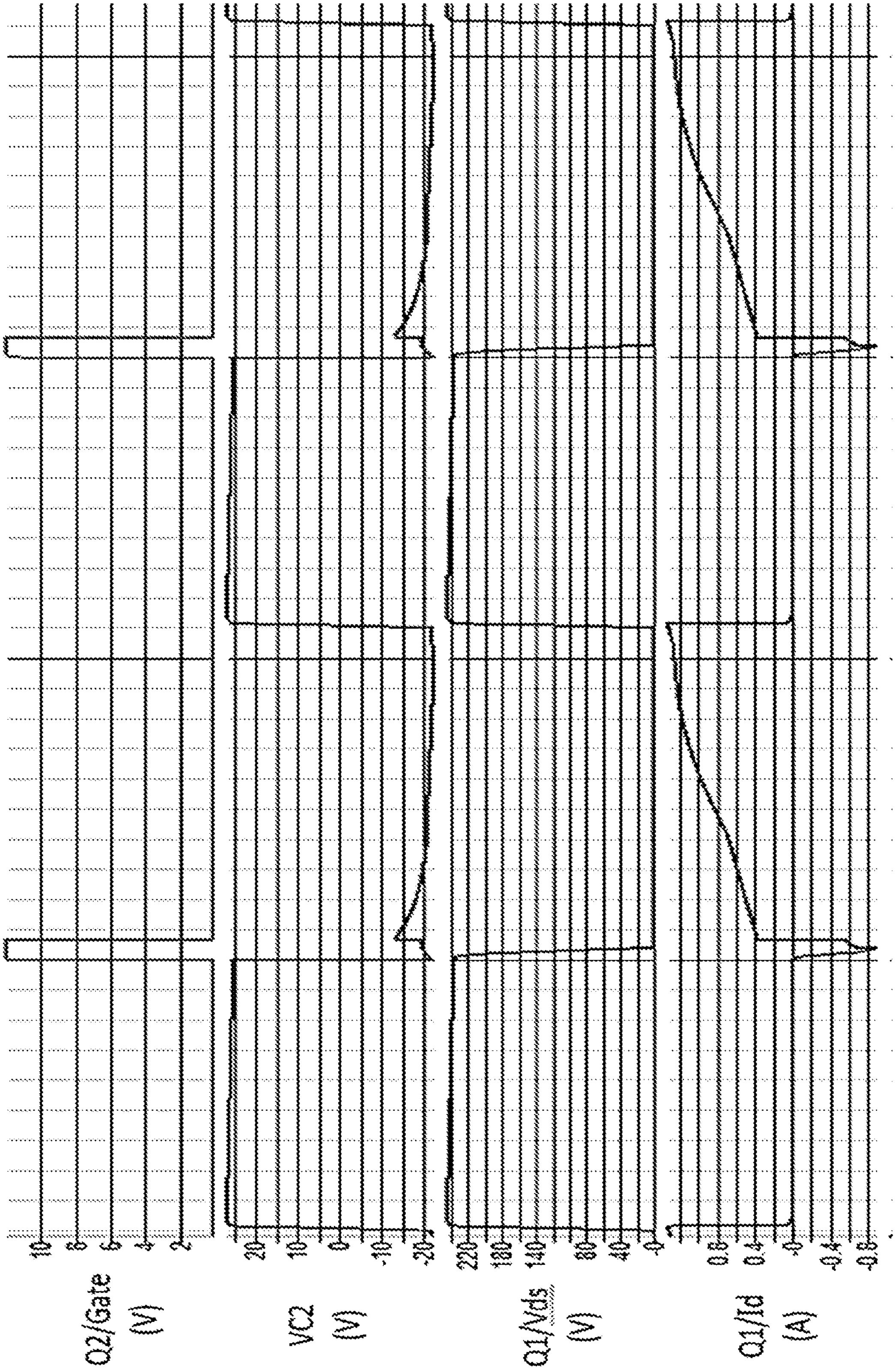
FIGS. 19 and 20 are diagrams of the simulation waveform of the circuit structure shown in FIG. 17.
Figure 20:
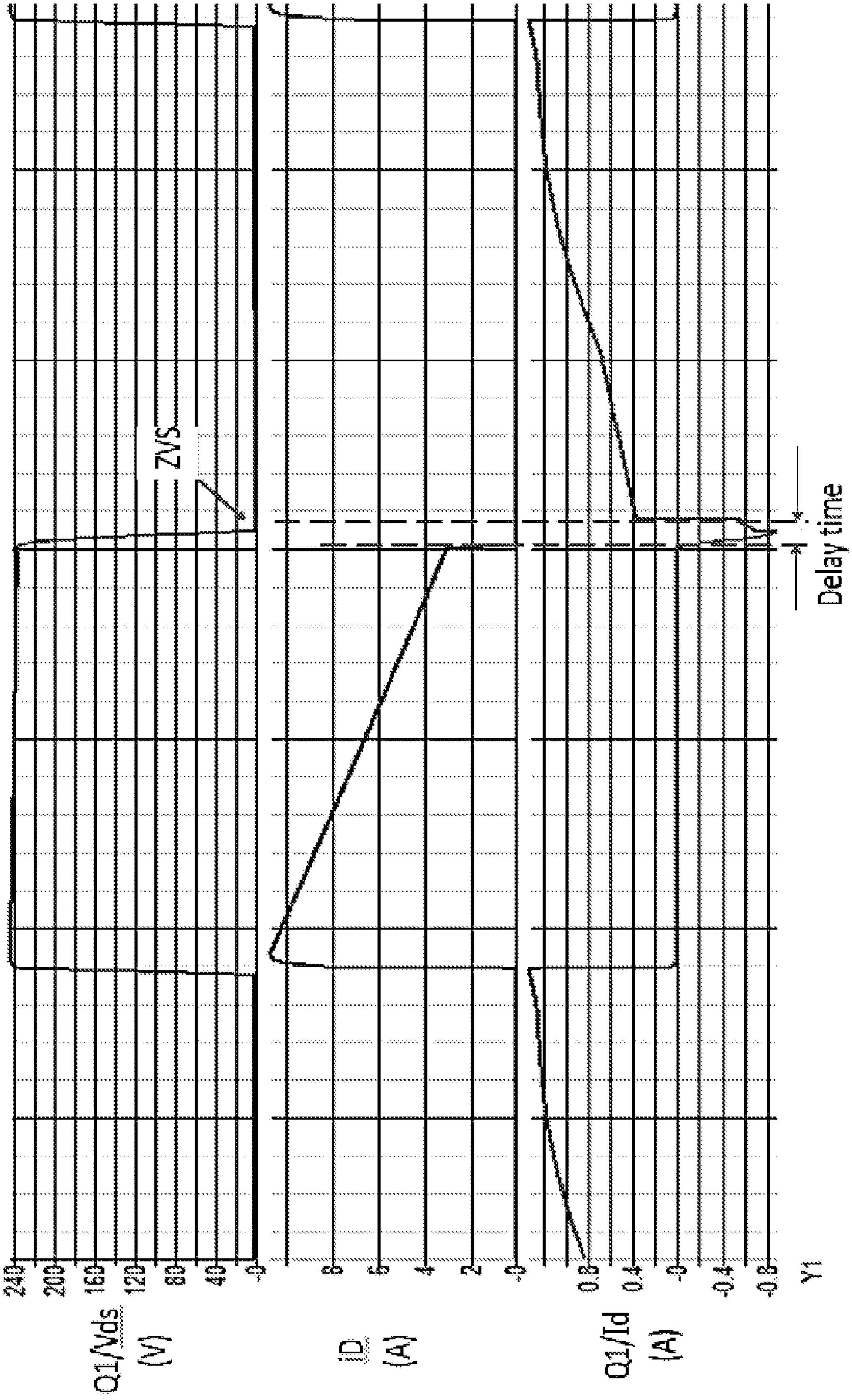

Specifically, referring to the simulated waveform diagram shown in FIG. 19, the waveform of the VC2 to ground is a square wave with the positive voltage and the negative voltage and is no longer a fixed DC negative voltage, which is the main characteristic of this type of structure. Referring to the simulated waveform diagram shown in FIG. 20, both the ground-switch type and the float-switch type similarly improve the described overlap and overcome cross-conduction challenge for the synchronous rectification under the CCM.

Another embodiment of the invention further provides a novel zero-voltage switching control method based on the above embodiments, which is applied to a voltage converter, the voltage converter at least including a first switch unit and a second switch unit, wherein the first switch unit is configured to switch on-off of an input winding of the voltage converter, and the second switch unit is configured to switch the on-off between an auxiliary winding and a negative voltage level, the input winding being coupled with the auxiliary winding, the method including the following steps:

before the first control signal is controlled to be connected to the input winding, the second switch unit is controlled to connect the auxiliary winding of the voltage converter with the negative voltage level in advance, and a negative current is generated by the input winding based on the coupling between the input winding and auxiliary winding to release the energy of parasitic capacitance in the first switch unit, so as to further forcing the input winding polarity to reverse until the first switch unit cross-voltage decays to an expected low switching potential and then conducts the input winding, in order to achieving the zero-voltage switching.

Specifically, the step in which the second switch unit is controlled to connect the auxiliary winding with the negative voltage level in advance further includes the following step: a timing of the second switch unit conducts the auxiliary winding with the negative voltage level is controlled according to a clock signal of the voltage converter and a feedback signal of the output winding of the voltage converter.

In an embodiment, the embodiment adopts an open-loop control method, wherein a first delay time is set after the second switch unit conducts the auxiliary winding with the negative voltage level and before the first switch unit conducts the input winding, and wherein the first delay time is set according to a level of the parasitic capacitance in the first electronic switch and is controlled programmable by PWM controller. In the embodiment, the cross-voltage of the first switch unit is pulled down to the expected low switching potential, which is controlled by the programmable first delay time. The switching potential may be selected from potentials with different optimal efficiencies. Normally, when the switching is performed within around 0V to 50V, the differences in the switching losses are extremely small, which may all be considered as a situation of zero-voltage switching.

Figure 21:
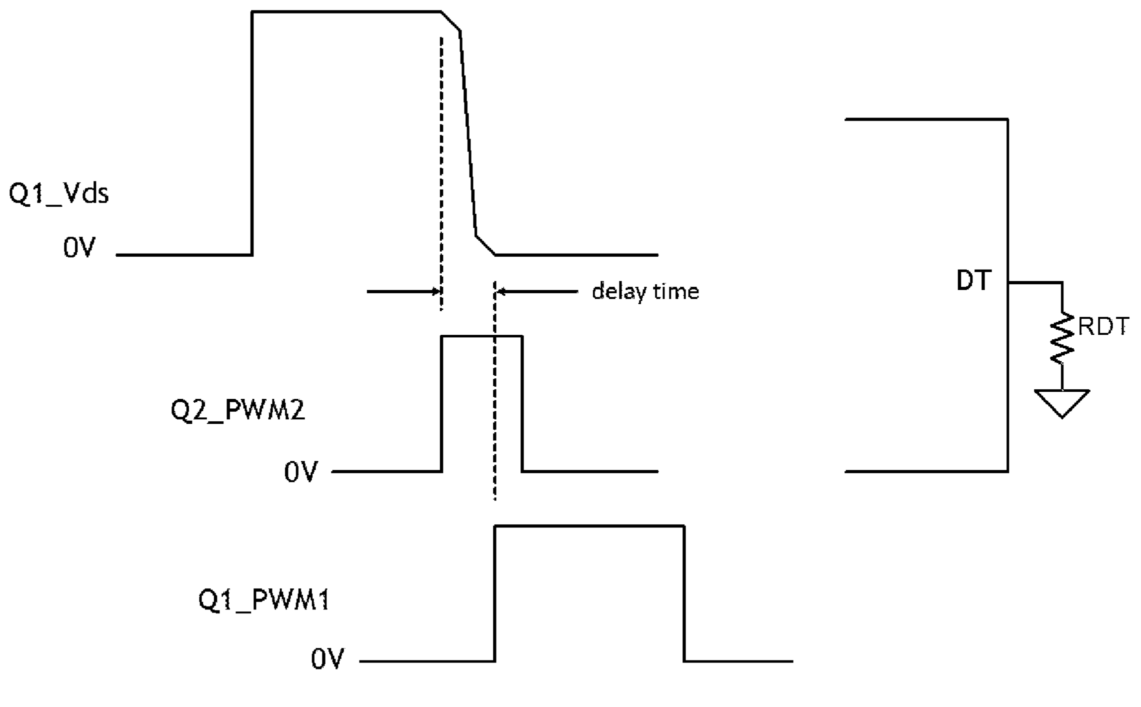
FIG. 21 is a logic diagram of controlling an open-loop in the novel zero-voltage switching control method according to an embodiment of the invention.

The open-loop control method of the embodiment refers to the actions between the first electronic switch Q1 and the second electronic switch Q2, without a mechanism for monitoring therebetween. With reference to FIG. 21, when the feedback compensation conditions are satisfied, and at the moment before the first electronic switch Q1 turns on, the control chip will turns on the second electronic switch Q2 one step ahead; once the Q2 is conducted, the cross voltage Vds of the Q1 is pulled down gradually, the time duration between Q2 is conducted to Q1 is called the first delay time. The length of the first delay time may be determined by the control chip. Once the set first delay time is reached, the control chip drives the first electronic switch Q1 to be conducted whether the ZVS condition has been met or not, so user must select a suitable first delay time correctly. The first delay time may be set internally by the control chip or by the user through the value of the component of the chip pin, e.g., by using a resistor RDT.

Preferably, the step of controlling programmable by a PWM controller further includes: the PWM controller sense a load current level of the voltage converter and performs compensation adjustment for the first delay time. Since the ZVS timing can be changed and followed by the output load current, a compensation mechanism for the first delay time may be required, wherein the larger the load is, the slightly longer time will be required to optimized the ZVS timing; therefore, in order to optimize the efficacy of the ZVS, the control chip must incorporate load conditions into the algorithm that has been configured with the first delay time, so that the first delay time that has already been set may be fine-tuned with the output load level. Further, the control chip may be configured to sensing the load current as: a voltage signal of the CS pin, or an error amount signal FB detected by the feedback compensation filter; for example: The larger the load is, the higher the CS voltage is and the higher the FB voltage is.

Preferably, after the first switch unit conducts the input winding and before the second switch unit is turned-off, a second delay time may be set for little extending a conduction time of the second switch unit to ensure that the first switch unit is completely conducted.

In another embodiment, a close loop control method is used, wherein after the second switch unit conducts the auxiliary winding with the negative voltage level, a waveform signal on the auxiliary winding may be detected to determine the ZVS timing: the first switch unit is turned-on when the waveform reaches a pre-set voltage threshold, wherein the waveform is obtained by the auxiliary winding through resistor voltage divider and capacitor filtering, and the first switch unit urn-on timing is controlled by adjusting a corresponding RC time constant.

Figure 22:
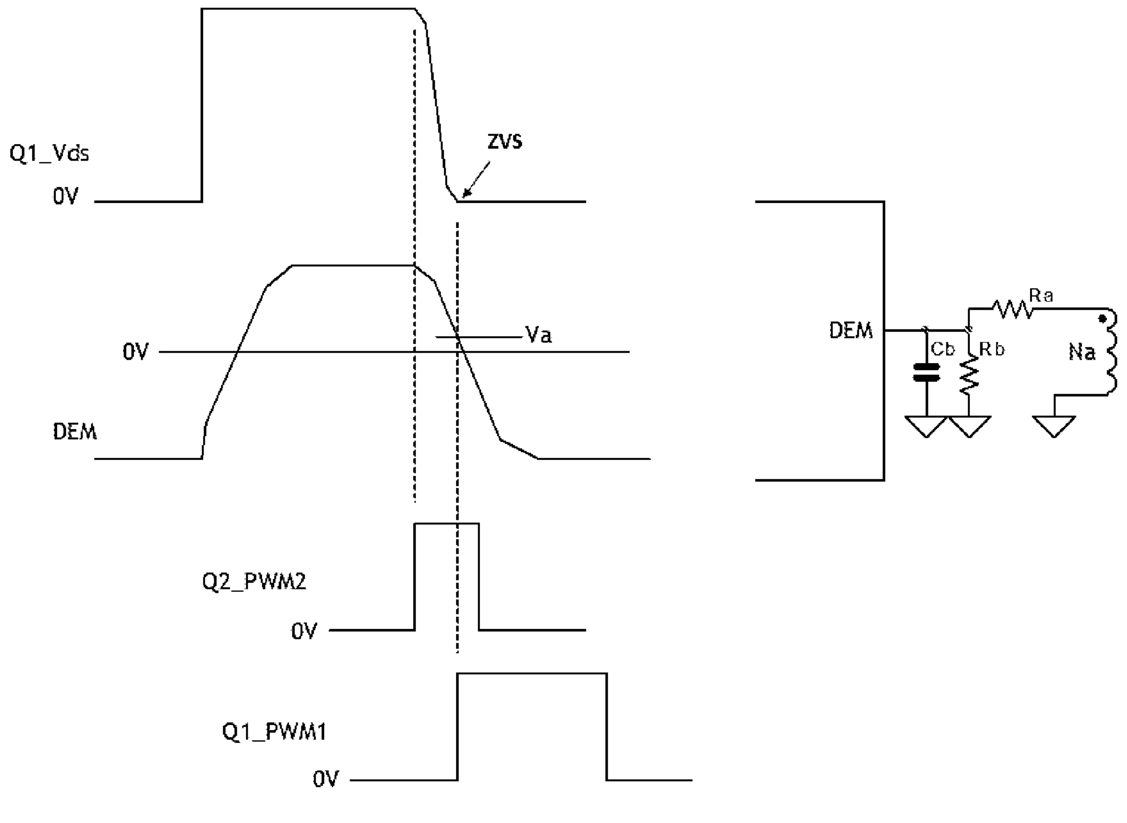
FIG. 22 is a logic diagram of controlling a close loop in the novel zero-voltage switching control method according to an embodiment of the invention.

The close loop control method of the embodiment refers to the actions between the first electronic switch Q1 and the second electronic switch Q2, with a mechanism for monitoring therebetween. With reference to FIG. 22, the embodiment takes advantage of an AC square wave signal on the auxiliary winding. The signal has a shape matched with that of the cross voltage Vds of the Q1 but is different from the latter in the level, and is of a waveform with a positive signal and a negative signal. Specifically, after the waveform on the auxiliary winding is subjected to the resistive voltage divider via the Ra and the Rb, a micro capacitor Cb is added, and then the obtained waveform is input into the pin of the control chip for detection, the pin here being named as DEM. Therefore, the waveform detected on the DEM pin will be a waveform that has been delayed by the RC constant, and the control chip detects the voltage Va. When the Q2 is conducted and the Vds of the Q1 begins to be pulled down, the DEM initiates the detection mechanism, and the control chip commands to drive the Q1 to be conducted once DEM is equal to Va, so that the user must correctly adjust the Cb or Ra/Rb values to set the appropriate RC constant to make the DEM to be equal to the Va, and the Vds of the Q1 falls just below the ZVS conditions, i.e., the delay time here is determined by the RC constants of Ra/Rb and Cb. In the embodiment, using the close loop control method has the advantage of basically no need for the control chip to compensate for the delay time for the level of the system load once the RC time constant is correctly selected.

Preferably, the embodiment further includes the following step: an output voltage of the voltage converter is captured in real-time, and a pulse width of the control signal of the first switch unit is modulated according to the output voltage. Preferably, the embodiment further includes the following step: a current signal flowing through the first electronic switch is sensed in real-time, then the current signal is converted into a voltage signal, and over current/short-circuit protection is performed. Specifically, for the specific implementation process of this embodiment method, please refer to the content described above, specifically not repeated here.

Another embodiment of the invention further provides a voltage converter based on the above embodiments, which includes the novel zero-voltage switching control circuit according to any one of the above embodiments. Specifically, the principle and the implementation method of the voltage converter in the embodiment have been described in detail in the description of the novel zero-voltage switching control circuit in the above embodiments, and will not be repeated here.

The implementations of the present invention are described in detail above with reference to the accompanying drawings, but the invention is not limited to the above implementations. Even if various changes are made to the invention, if these changes fall within the scope of the claims of the invention and its equivalent technology, they still fall within the scope of the request protection of the invention.

What is claimed is:

1. A zero-voltage switching control circuit, applied to a voltage converter, the zero-voltage switching control circuit comprising a controller, a first switch unit, and a second switch unit, the controller being in a signal connection with the first switch unit and the second switch unit respectively;

wherein the controller is configured to generate a first control signal to control the first switch unit to switch on-off of an input winding of the voltage converter, and to generate a second control signal to control the second switch unit to switch on-off between an auxiliary winding of the voltage converter and a negative voltage level, the input winding being coupled with the auxiliary winding;

wherein before the first control signal conducts the input winding, the auxiliary winding of the voltage converter is conducted with the negative voltage level in advance, and the input winding be forced to generate a negative current based on the coupling between the input winding and the auxiliary winding, to release the energy of a parasitic capacitance in the first switch unit, so as to further forcing the input winding polarity to reverse until the first switch unit cross voltage decays to an expected low switching potential voltages, then to conduct the described input winding.

2. The zero-voltage switching control circuit according to claim 1, wherein the second switch unit comprises a second electronic switch, a second diode, and a second capacitor, and the auxiliary winding is a single winding;

one end of the second electronic switch and a negative electrode of the second diode are electrically connected with one end of the auxiliary winding respectively, the other end of the auxiliary winding is connected to primary-side ground; the other end of the second electronic switch is electrically connected with a positive electrode of the second diode and one end of the second capacitor, and the other end of the second capacitor is connected to primary-side ground, wherein a node between the second diode and the second capacitor is configured to generate the negative voltage level.

3. The zero-voltage switching control circuit according to claim 1, wherein the second switch unit comprises a second electronic switch, a second diode, and a second capacitor, and the auxiliary winding is a double winding comprising a coupled winding and a negative voltage winding;

one end of the second electronic switch is electrically connected with one end of the coupled winding, the other end of the coupled winding is connected to primary-side ground; the other end of the second electronic switch is electrically connected with a positive electrode of the second diode and one end of the second capacitor, and the other end of the second capacitor is connected to primary-side ground; the negative electrode of the second diode is electrically connected with one end of the negative voltage winding, and the other end of the negative voltage winding is connected to primary-side ground, wherein a node between the second diode and the second capacitor is configured to generate the negative voltage level.

4. The zero-voltage switching control circuit according to claim 3, wherein the second switch unit further comprises a drive resistor, a drive capacitor, and a current limiting resistor;

a control end of the second electronic switch is electrically connected with one end of the drive resistor and the drive capacitor respectively, the other end of the drive resistor is electrically connected to the positive electrode of the second diode, and the other end of the drive capacitor is electrically connected with the controller via the current limiting resistor.

5. The zero-voltage switching control circuit according to claim 3, further comprising an offset clamp unit, wherein the offset clamp unit comprising a third electronic switch, a clamp resistor, and a clamp capacitor;

wherein one end of the third electronic switch is electrically connected with the control end of the second electronic switch, the other end of the third electronic switch is electrically connected with the positive electrode of the second diode and one end of the clamp resistor, respectively, and a control end of the third electronic switch is electrically connected with the other end of the clamp resistor and one end of the clamp capacitor respectively, the other end of the clamp capacitor being connected to primary-side ground, the third electronic switch could be a NMOSFET or NPN-BJT.

6. The zero-voltage switching control circuit according to claim 3, wherein the second switch unit further comprises a current limiting inductor and a third diode; the current limiting inductor is configured to limit an inrush current level passing through the second electronic switch, and the third diode is configured to block a reverse current from passing through a body diode of the second electronic switch.

7. The zero-voltage switching control circuit according to claim 1, wherein the second switch unit comprises a second electronic switch and a second capacitor, and the auxiliary winding is a single winding;

one end of the second capacitor is electrically connected with one end of the auxiliary winding, the other end of the auxiliary winding is connected to primary-side ground, and the other end of the second capacitor is connected to primary-side ground via the second electronic switch.

8. The zero-voltage switching control circuit according to claim 7, wherein the second switch unit further comprises a current limiting inductor disposed between the second capacitor and the auxiliary winding, a second diode, and a third diode;

a positive electrode of the second diode and a negative electrode of the third diode are electrically connected with the second capacitor, a negative electrode of the second diode is electrically connected with the auxiliary winding, and a positive electrode of the third diode is electrically connected with the auxiliary winding via the current limiting inductor, wherein the current limiting inductor is configured to limit an inrush current level passing through the second electronic switch.

9. The zero-voltage switching control circuit according to claim 1, wherein the second switch unit comprises a second electronic switch, a second diode, a third diode, and a second capacitor, and the auxiliary winding is a double-winding comprising a coupled winding and a negative voltage winding;

the negative electrode of the second diode is electrically connected with one end of the negative voltage winding, and the other end of the negative voltage winding is connected to primary-side ground; the positive electrode of the second diode and the negative electrode of the third diode are electrically connected with one end of the second capacitor, and the positive electrode of the third diode is electrically connected with one end of the coupled winding; the other end of the coupled winding is connected to primary-side ground, and the other end of the second capacitor is connected to primary-side ground via the second electronic switch, wherein the node between the second diode and the second capacitor is configured to generate the negative voltage level.

10. The zero-voltage switching control circuit according to claim 9, wherein the second switch unit further comprises a current limiting inductor disposed between the third diode and the coupled winding, and the current limiting inductor is configured to limit an inrush current level passing through the second electronic switch.

11. The zero-voltage switching control circuit according to any one of claim 10, wherein the second switch unit further comprises a drive resistor and a current limiting resistor;

the control end of the second electronic switch is electrically connected with one end of the drive resistor and the current limiting resistor, respectively, the other end of the drive resistor is connected to primary-side ground, and the other end of the current limiting resistor is electrically connected with the controller.

12. A zero-voltage switching control method, applied to a voltage converter, the voltage converter at least comprising a first switch unit and a second switch unit, wherein the first switch unit is configured to switch on-off of an input winding of the voltage converter, and the second switch unit is configured to switch on-off between an auxiliary winding of the voltage converter and a negative voltage level, the input winding being coupled with the auxiliary winding, the method comprising steps of:

before controlling a first control signal to turn-on the first switch unit and to conduct the input winding, controlling the second switch unit to connect the auxiliary winding of the voltage converter with the negative voltage level in advance, and the input winding be forced to generate a negative current based on the coupling between the input winding and auxiliary winding to release the energy of parasitic capacitance in the first switch unit, so as to further enable polarity inversion of the input winding until the first switch unit cross voltage decays to an expected low switching potential then conducts the described input winding, for achieving the zero-voltage switching.

13. The zero-voltage switching control method according to claim 12, wherein the controlling the second switch unit to conduct the auxiliary winding with the negative voltage level in advance further comprises:

controlling a timing when the second switch unit conducts the auxiliary winding with the negative voltage level according to a clock signal of the voltage converter and a feedback signal of the output winding of the voltage converter.

14. The zero-voltage switching control method according to claim 12, wherein the releasing an energy of a parasitic capacitance in the first switch unit and conducts the input winding until the first switch unit cross voltage decays to an expected low switching potential further comprises:

setting a first delay time after the second switch unit conducts the auxiliary winding with the negative voltage level and before the first switch unit conducts the input winding, wherein the first delay time is set according to a volume of the parasitic capacitance in the first electronic switch, and is controlled programmable by a PWM controller of the voltage converter.

15. The zero-voltage switching control method according to claim 14, wherein the controlling programmable by a PWM controller of the voltage converter further comprises:

sensing the output load current level by the PWM controller of the voltage converter and performing compensation adjustment for the first delay time according to the output load current level feedback.

16. The zero-voltage switching control method according to claim 14, wherein after the first switch unit conducts the input winding and before the second switch unit is turned-off, a second delay time is set for delaying a conduction time of the second switch unit to ensure that the first switch unit is completely conducted before the second switch unit is turned-off.

17. The zero-voltage switching control method according to claim 12, wherein the releasing energy of parasitic capacitance in the first switch unit and conducting the input winding until the first switch unit-cross-voltage decays to an expected low switching potential further comprises:

sensing the waveform signal on the auxiliary winding and controlling turn-on timing of the first switch unit according to the described waveform signal after the second switch unit conducts the auxiliary winding with the negative voltage level.

18. The zero-voltage switching control method according to claim 12, wherein the controlling turn-on timing of the first switch unit according to the described waveform signal further comprises:

controlling the first switch unit to conduct the input winding when the voltage of the described waveform level reaches the pre-set voltage threshold, wherein the waveform signal is obtained by the auxiliary winding through the resistor divider with capacitor filtering, and the timing of the first switch unit conducts the input winding is controlled by adjusting the corresponding RC time constant.

19. The zero-voltage switching control circuit according to claim 2, wherein the second switch unit further comprises a drive resistor, a drive capacitor, and a current limiting resistor;

a control end of the second electronic switch is electrically connected with one end of the drive resistor and the drive capacitor respectively, the other end of the drive resistor is electrically connected to the positive electrode of the second diode, and the other end of the drive capacitor is electrically connected with the controller via the current limiting resistor.

* * * * *